US012694639B2

(12) United States Patent
Feldman et al.

(10) Patent No.: US 12,694,639 B2
(45) Date of Patent: Jul. 28, 2026

(54) DETECTION OF PROHIBITED OBJECTS CONCEALED IN AN ITEM, USING A THREE-DIMENSIONAL IMAGE OF THE ITEM

(71) Applicant: Seetrue Screening Ltd., Tel Aviv (IL)

(72) Inventors: Doron Feldman, New York, NY (US);
Assaf Frenkel, Ramat Hasharon (IL)

(73) Assignee: Seetrue Screening Ltd, Tel Aviv (IL)

( * ) Notice: Subject to any disclaimer, the term of this patent is extended or adjusted under 35 U.S.C. 154(b) by 429 days.

(21) Appl. No.: 18/126,589

(22) Filed: Mar. 27, 2023

(65) Prior Publication Data

US 2024/0118450 A1 Apr. 11, 2024

(30) Foreign Application Priority Data

Jul. 7, 2022 (IL) .......................................... 294593

(51) Int. Cl.
G06V 10/20 (2022.01)
G01V 5/226 (2024.01)
(Continued)

(52) U.S. Cl.
CPC .............. G06V 10/255 (2022.01); G06T 5/60 (2024.01); G06T 17/00 (2013.01); G06V 10/764 (2022.01); G01V 5/226 (2024.01); G06T 7/136 (2017.01)

(58) Field of Classification Search
CPC .. G06V 10/255; G06V 10/764; G06V 10/762; G06V 10/774; G06V 10/82;
(Continued)

(56) References Cited

U.S. PATENT DOCUMENTS

2018/0211119 A1 7/2018 Liu et al.
2020/0333266 A1* 10/2020 Li ........................... G06T 17/00
(Continued)

FOREIGN PATENT DOCUMENTS

WO WO-2020239227 A1 * 12/2020
WO WO-2023009557 A1 * 2/2023 ............. G06N 3/045

OTHER PUBLICATIONS

Riffo Vladimir et al, IEEE Transactions on Systems, Man, and Cybernetics: Systems, vol. 46, No. 4, pp. 472-482, 2016.
(Continued)

*Primary Examiner* — Jennifer Mehmood
*Assistant Examiner* — Heath E. Wells
(74) *Attorney, Agent, or Firm* — Whitestone Law, PLLC

(57) ABSTRACT

Systems and methods are provided for enabling detection of prohibited objects using three-dimensional imaging data. The system obtains a three-dimensional representation of at least part of an item. The 3D representation includes multiple points with associated intensity values determined based on data acquired by an imaging device. A cluster of points corresponding to an object of interest is identified within the 3D representation. From this cluster, data indicating the position and the orientation of the object is determined. The data indicating the position and the orientation of the object is used to generate a two-dimensional representation of the object with an orientation which is chosen to facilitate detectability of the object as a prohibited item by a detection algorithm (such as a machine learning model).

19 Claims, 18 Drawing Sheets

710

(51) Int. Cl.

| | |
|---|---|
| *G06T 5/60* | (2024.01) |
| *G06T 7/136* | (2017.01) |
| *G06T 17/00* | (2006.01) |
| *G06V 10/764* | (2022.01) |

(58) Field of Classification Search

CPC .......... G06V 20/50; G06V 20/64; G06T 5/60; G06T 17/00; G06T 7/136; G01V 5/226

USPC ......................................................... 382/103

See application file for complete search history.

(56) References Cited

U.S. PATENT DOCUMENTS

| | | | |
|---|---|---|---|
| 2020/0394442 A1* | 12/2020 | Ahmed | G06N 3/09 |
| 2021/0125036 A1* | 4/2021 | Tremblay | G06N 3/094 |
| 2023/0360355 A1* | 11/2023 | Venetianer | G06V 10/255 |

OTHER PUBLICATIONS

Qian Wang et al, arxiv.org, Cornell University Library, 2019.
Anqi Yang, "3D Object Detection from CT Scans using a Slice-and-fuse Approach," Carnegie Mellon University Master Thesis, Technical Report No. CMU-RI-TR-19-23, May 2019, 33 pages.

* cited by examiner

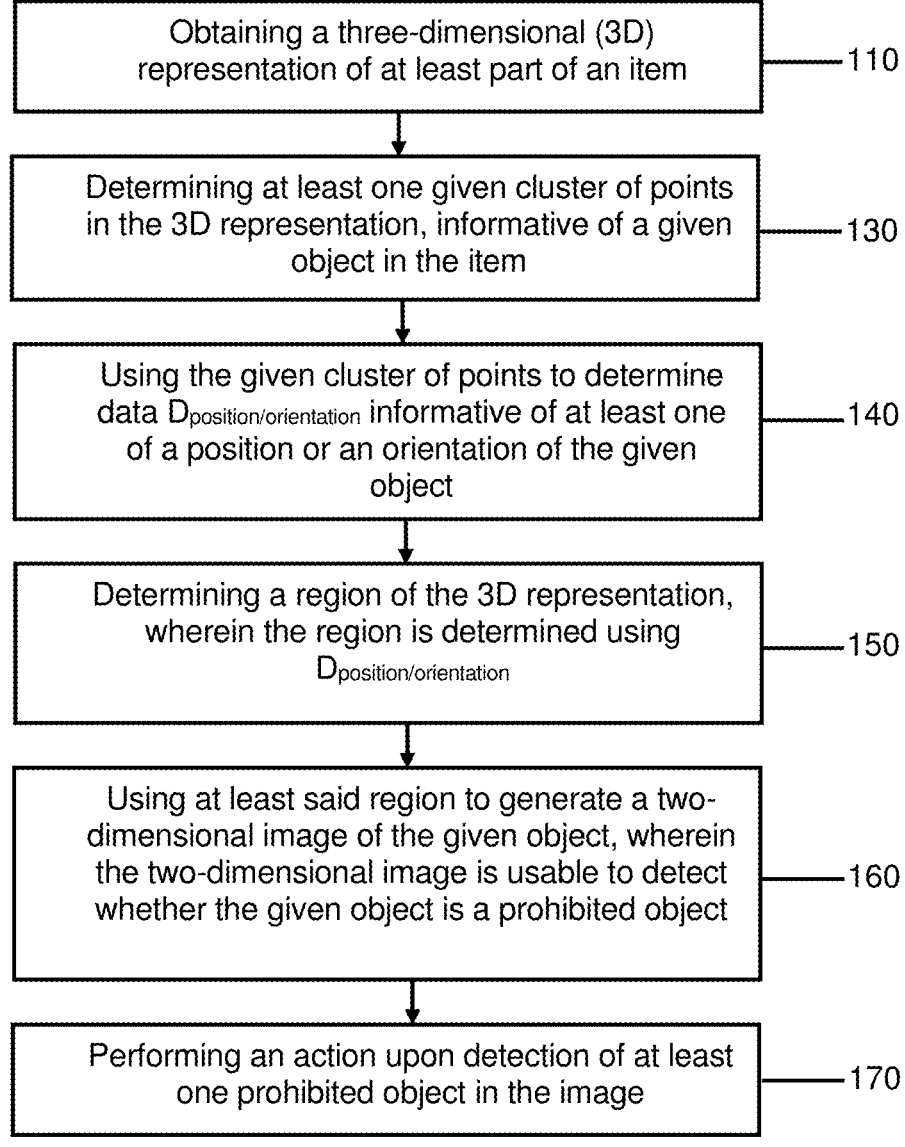

Obtaining a three-dimensional (3D) representation of at least part of an item —110

Determining at least one given cluster of points in the 3D representation, informative of a given object in the item —130

Using the given cluster of points to determine data $D_{position/orientation}$ informative of at least one of a position or an orientation of the given object —140

Determining a region of the 3D representation, wherein the region is determined using $D_{position/orientation}$ —150

Using at least said region to generate a two-dimensional image of the given object, wherein the two-dimensional image is usable to detect whether the given object is a prohibited object —160

Performing an action upon detection of at least one prohibited object in the image —170

| | |
|---|---|
| Obtaining a two-dimensional plane of the 3D representation determined using one or more of the axes X, Y and Z | 300 |
| Determining a volume of the 3D representation, wherein a position of the volume with respect to the plane is determined using one or more of the axes X, Y and Z | 310 |

380

Obtaining one or more weights informative of a geometric distribution of the given object along one or more directions — 400

Using one or more of the weights to determine whether the given cluster of points is informative of a given object which has a shape matching a shape of a prohibited object — 410

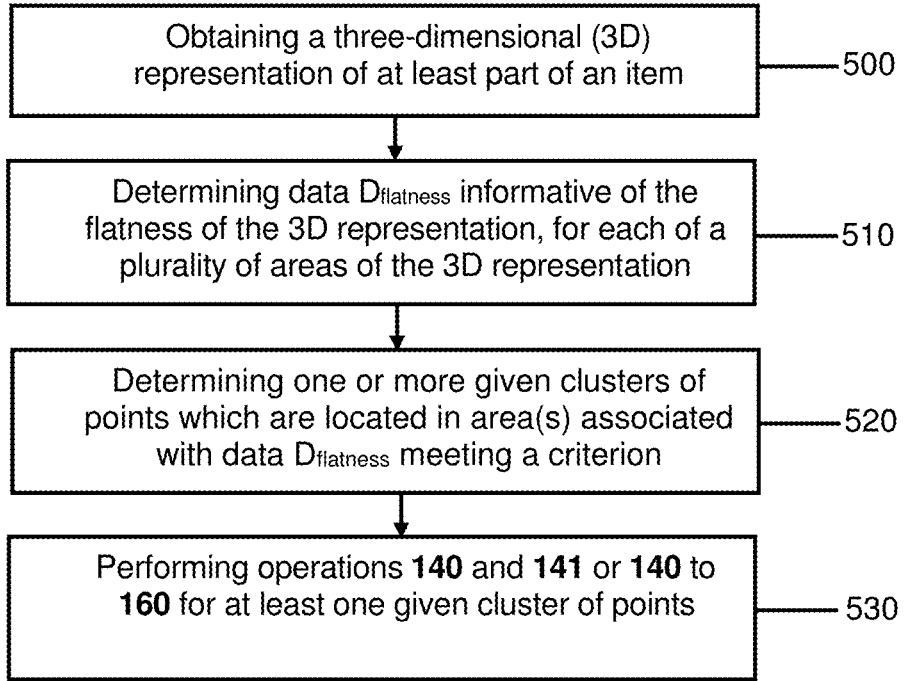

Obtaining a three-dimensional (3D) representation of at least part of an item —500

Determining data D$_{flatness}$ informative of the flatness of the 3D representation, for each of a plurality of areas of the 3D representation —510

Determining one or more given clusters of points which are located in area(s) associated with data D$_{flatness}$ meeting a criterion —520

Performing operations 140 and 141 or 140 to 160 for at least one given cluster of points —530

FIG. 5A

DETECTION OF PROHIBITED OBJECTS CONCEALED IN AN ITEM, USING A THREE-DIMENSIONAL IMAGE OF THE ITEM

TECHNOLOGICAL FIELD

The invention is in the field of detection of prohibited objects concealed in an item, using image processing.

BACKGROUND

At a security checkpoint (for example in an airport), an acquisition device is used in order to acquire an image of an item carried by a person (e.g. checked baggage). The image can be verified by an operator and/or by a computerized system in order to detect the presence of a prohibited object (e.g., a weapon). Malicious persons use various techniques in order to prevent detection of the prohibited object in their items.

There is therefore a need to propose new systems and methods to automatically detect prohibited objects concealed in an item.

GENERAL DESCRIPTION

In accordance with certain aspects of the presently disclosed subject matter, there is provided a system comprising a processor and memory circuitry (PMC) configured to obtain a three-dimensional (3D) representation of at least part of an item, wherein the three-dimensional representation includes a plurality of points each associated with an intensity obtained based on an acquisition of the at least part of the item by an acquisition device, determine at least one given cluster of points in the 3D representation, the given cluster of points being informative of at least one given object present in the at least part of the item, use the given cluster of points to determine data Dposition/orientation informative of at least one of a position or an orientation of the given object, and use data Dposition/orientation to generate a two-dimensional image informative of the given object, wherein the two-dimensional image is usable to detect whether the given object is a prohibited object.

In addition to the above features, the system according to this aspect of the presently disclosed subject matter can optionally comprise one or more of features (i) to (xxviii) below, in any technically possible combination or permutation:

i. the system is configured to determine a region of the 3D representation, wherein the region is determined using Dposition/orientation, and use at least said region to generate a two-dimensional image informative of the given object, wherein the two-dimensional image is usable to detect whether the given object is a prohibited object;

ii. the region is a three-dimensional region, wherein the system is configured to use Dposition/orientation to convert intensity of points of the three-dimensional region into a two-dimensional image displaying the given object with a viewing angle matching a desired viewing angle;

iii. the system is configured to determine, for each given cluster of points informative of a given object, a single region using at least part of the given cluster of points and data Dposition/orientation informative of at least one of a position or an orientation of the given object, and to use at least said single region to generate a two-dimensional image informative of the given object;

iv. Dposition/orientation includes one or more weights informative of a geometric distribution of the given object along one or more directions, wherein the system is configured to use the one or more weights to determine the region;

v. the region is determined based on Dposition/orientation for a first type of prohibited objects differently than for a second type of prohibited objects, wherein the second type is different from the first type;

vi. Dposition/orientation includes one or more axes Xobj, Yobj and Zobj informative of axes of the given object;

vii. The system is configured to obtain one or more weights informative of a geometric distribution of the given object along one or more directions, and use one or more of the weights to determine whether the given cluster of points is informative of a given object which has a shape matching a shape of a prohibited object;

viii. Dposition/orientation is informative of three axes Xobj, Yobj, Zobj informative of axes of the given object, wherein the system is configured to determine a region of the 3D representation comprising at least part of a plane which comprises two axes Xobj, Yobj among the axes Xobj, Yobj, Zobj, or determine a region of the 3D representation comprising at least part of a plane which is orthogonal to the axis Zobj;

ix. Dposition/orientation is informative of three axes Xobj, Yobj, Zobj informative of axes of the given object, wherein the system is configured to obtain, for the axis Xobj, a weight WX informative of geometric distribution along said axis X, obtain, for the axis Yobj, a weight Wy informative of geometric distribution along said axis Y, obtain, for the axis Zobj, a weight WZ informative of geometric distribution along said axis Z, perform (a) or (b): (a) determine a region of the 3D representation comprising at least part of a plane which includes two axes Xobj, Yobj, wherein the weights WX, Wy and WZ indicate that geometric distribution is greater along the two axes Xobj, Yobj than along the axis Zobj, (b) determine a region of the 3D representation along a plane which is orthogonal to axis Zobj, wherein the weights WX, Wy and WZ indicate that geometric distribution along the axis Zobj is smaller than along the two axes Xobj, Yobj;

x. the system is configured to determine a region of the 3D representation which includes at least part of a plane of the 3D representation determined using Dposition/orientation; a volume of the 3D representation, wherein a position of the volume with respect to the plane is determined using Dposition/orientation;

xi. the volume has a height H+ above the plane along a direction Zobj, or has a height H− below the plane along the direction Zobj, wherein Zobj has been determined using Dposition/orientation;

xii. one or more dimensions of the volume is selected based on an estimate of one or more dimensions of a prohibited object;

xiii. the system is configured to use said region to generate a two-dimensional image informative of the given object, wherein one or more dimensions of the volume are selected to include mostly or only points which are informative of the given object, wherein a minority or none of these points are informative of other neighbouring objects of the given object in the item;

xiv. the system is configured to obtain an initial three-dimensional (3D) representation of the at least part of the item, select a fraction of the points of the initial three-dimensional (3D) representation which are associated with an intensity which is a predefined range and use the selected points to generate the three-dimensional (3D) representation of the at least part of the item;

xv. the points which are associated with an intensity which is within the predefined range are informative of metallic points of the at least part of the item, or plastic points of the at least part of the item, or organic points of at least part of the item, or ceramic points of at least part of the item;

xvi. the system is configured to divide the three-dimensional representation of the at least part of the item into a plurality of clusters, wherein points which belong to a same cluster meet a proximity criterion;

xvii. the system is configured to select the given cluster as a cluster of the plurality of clusters which includes a number of points which is above a threshold;

xviii. the system is configured to that one or more given clusters of the plurality of clusters do not represent a prohibited object, based on a detection that one or more geometrical parameters of each of the one or more given clusters do not comply with an expected range;

xix. the system is configured to apply a filter to at least part of the three-dimensional representation of the at least part of the item, and to determine a plurality of clusters on the filtered three-dimensional representation;

xx. the system is configured to determine data Dflatness informative of a flatness of areas of the three-dimensional representation, use the data Dflatness to determine a given cluster of points in the three-dimensional representation, the given cluster of points being informative of at least one given object present in the item, use the given cluster of points to determine data Dposition/orientation informative of at least one of a position or an orientation of the given object, and use data Dposition/orientation to generate a two-dimensional image informative of the given object, wherein the two-dimensional image is usable to detect whether the given object is a prohibited object;

xxi. the system is configured to determine a region of the 3D representation, wherein the region is determined using at least part of the given cluster of points and Dposition/orientation, and use at least said region to generate a two-dimensional image informative of the given object, wherein the two-dimensional image is usable to detect whether the given object is a prohibited object;

xxii. the system is configured to determine, for each given point of a plurality of points of the three-dimensional representation, data Dflatness informative of a flatness of said given point, determine a given three-dimensional area of the 3D representation, said given three-dimensional area including said given point, determine a given cluster of points within said given three-dimensional area, use the given cluster of points to determine data Dposition/orientation informative of an orientation of the given object, xxiii. the system is configured to determine a region of the 3D representation, wherein the region is determined using Dposition/orientation, and use at least said region to generate a two-dimensional image informative of the given object, wherein the two-dimensional image is usable to detect whether the given object is a prohibited object;

xxiv. one or more geometrical parameters of the three-dimensional area are selected depending on a type of a prohibited object;

xxv. the system is configured to feed the two-dimensional image of the given object to a trained machine learning model, and use the trained machine learning model to determine whether the given object is a prohibited object;

xxvi. the trained machine learning model has been trained with images of prohibited objects, wherein most of the images of prohibited objects used to train the machine learning model include prohibited objects observed with a viewing angle which matches an optimal viewing angle according to a criterion;

xxvii. the trained machine learning model has been trained with images of prohibited objects, wherein most of the images of prohibited objects used to train the machine learning model include prohibited objects observed with a viewing angle which matches a viewing angle of the given object in the two-dimensional image according to a criterion; and xxviii. the prohibited object is a weapon.

In accordance with certain aspects of the presently disclosed subject matter, there is provided a method comprising, by a processor and memory circuitry (PMC): obtaining a three-dimensional (3D) representation of at least part of an item, wherein the three-dimensional representation includes a plurality of points each associated with an intensity obtained based on an acquisition of the at least part of the item by an acquisition device, determining at least one given cluster of points in the 3D representation, the given cluster of points being informative of at least one given object present in the at least part of the item, using the given cluster of points to determine data Dposition/orientation informative of at least one of a position or an orientation of the given object, and using data Dposition/orientation to generate a two-dimensional image informative of the given object, wherein the two-dimensional image is usable to detect whether the given object is a prohibited object.

In addition to the above features, the method according to this aspect of the presently disclosed subject matter can optionally implement one or more of features (i) to (xxviii) as described with reference to the system above.

In accordance with certain aspects of the presently disclosed subject matter, there is provided a non-transitory storage device readable by a machine, tangibly embodying a program of instructions executable by the machine to perform operations as described with reference to the method above (optionally including the features (i) to (xxviii) as described with reference to the system above).

According to some embodiments, the proposed solution improves accuracy of detection of prohibited objects in an image of an item. As a consequence, safety of persons and/or passengers is increased.

According to some embodiments, the proposed solution is flexible and can be adapted to various types of different prohibited objects that need to be detected.

According to some embodiments, the proposed solution is able to generate an optimal two-dimensional view of a prohibited object, using a three-dimensional image including the prohibited object. Therefore, this facilitates detection of the prohibited object.

According to some embodiments, the proposed solution is able to determine a region of a 3D representation, which has a high likelihood to include all points informative of a prohibited object.

According to some embodiments, the proposed solution does not require to fuse different outputs calculated for different slices of the 3D representation, but rather provides an optimal region of the 3D representation which has a high likelihood to include all points informative of a prohibited object. Therefore, this optimal region can be used as such to generate an optimal image of the prohibited object, which enables a machine learning model to provide a direct and accurate estimate of the presence of the prohibited object.

According to some embodiments, the proposed solution enables to detect prohibited objects which are concealed by obstructing parts of an item which are typical in the scanned item (e.g., handle, metallic tubes, combination lock, metallic reinforcement strips and/or sheets of a bag or a suitcase, etc.). Although conventional methods face difficulties in detecting prohibited objects which are concealed using concealing parts of an item (since the concealing parts tend to hide, at least partially, the prohibited objects in the image), the proposed solution improves detection of the prohibited objects under such harsh conditions. In particular, according to some embodiments, the proposed solution is able to generate an image of a prohibited object located in the vicinity of the concealing part, wherein the image is free of the concealing part. The clutter is therefore strongly reduced.

According to some embodiments, the proposed solution improves accuracy of detection of prohibited objects while being computationally efficient.

According to some embodiments, the proposed solution detects prohibited objects in real time or quasi real time.

According to some embodiments, the proposed solution detects prohibited objects which are made of a material (such as plastic) which is difficult to identify in the images.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1C illustrates a particular embodiment of the method of FIG. 1B;

FIG. 5A illustrates a flow chart of another embodiment of a method of detecting a prohibited object in an item, using a three-dimensional representation of the item;

DETAILED DESCRIPTION OF EMBODIMENTS

Figure 1A:
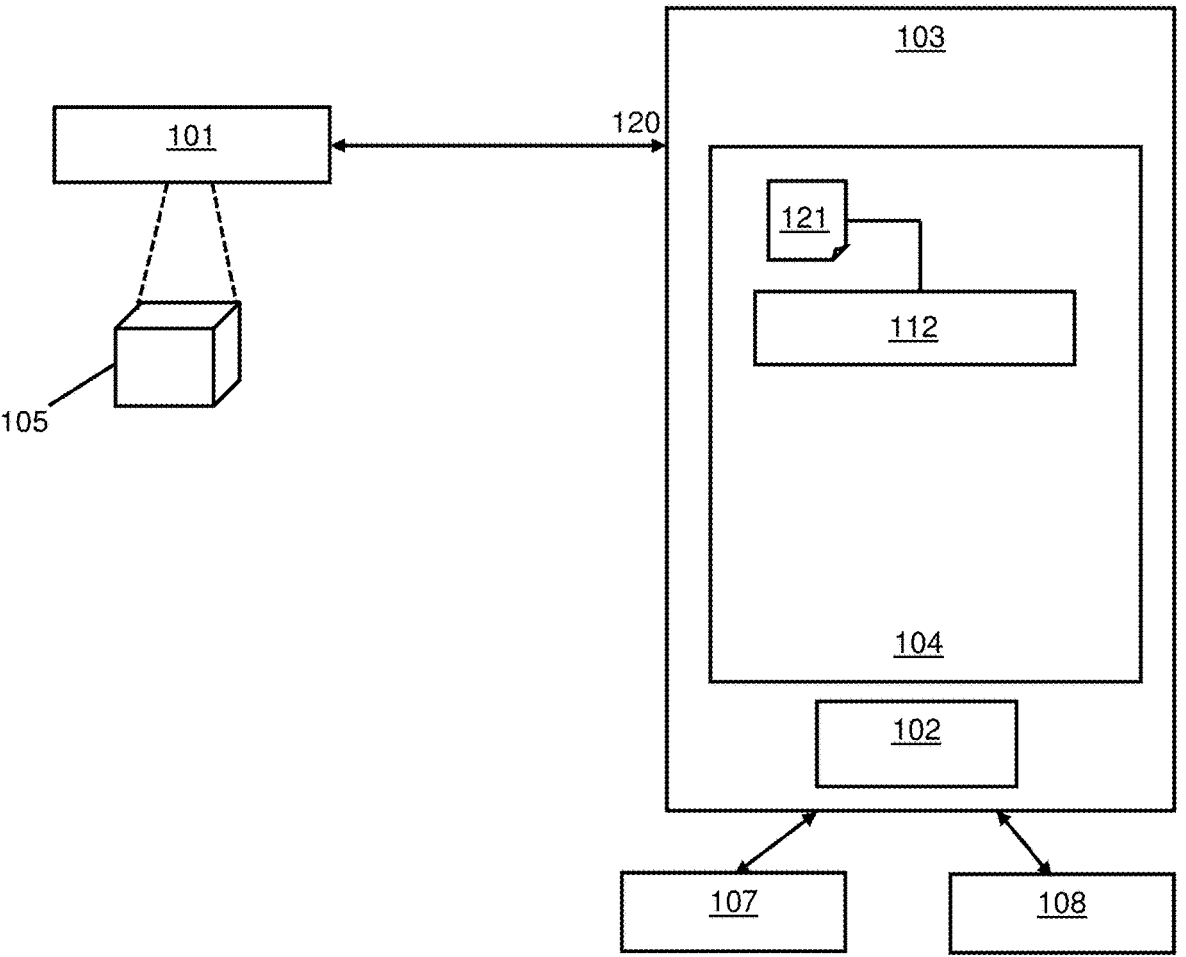
FIG. 1A illustrates an architecture of a system according to some embodiments of the invention.

In the following detailed description, numerous specific details are set forth in order to provide a thorough understanding of the invention. However, it will be understood by those skilled in the art that the presently disclosed subject matter may be practiced without these specific details. In other instances, well-known methods have not been described in detail so as not to obscure the presently disclosed subject matter.

The terms "computer", "computer device", "computerized device" should be expansively construed to include any kind of hardware-based electronic device with a data processing circuitry (e.g., digital signal processor (DSP), a GPU, a TPU, a field programmable gate array (FPGA), an application specific integrated circuit (ASIC), microcontroller, microprocessor etc.). The data processing circuitry can comprise, for example, one or more processors operatively connected to computer memory, loaded with executable instructions for executing operations, as further described below. The data processing circuitry encompasses a single processor or multiple processors, which may be located in the same geographical zone or may, at least partially, be located in different zones, and may be able to communicate together.

The presently disclosed subject matter contemplates various methods as disclosed herein and respective processing circuitries (e.g., integrated in the computerized device) which are configured to perform these methods.

The presently disclosed subject matter further contemplates one or more computer readable storage mediums having data stored therein representing software executable by a computer, the software including instructions for performing one or more of the methods disclosed herein. Unless specifically stated otherwise, as apparent from the following discussions, it is appreciated that throughout the specification discussions utilizing terms such as "obtaining", "determining", "using", "training", "selecting", "dividing", "performing" or the like, refer to the action(s) and/or process(es)

of a computer that manipulates and/or transforms data into other data, said data represented as physical, such as electronic, quantities and/or said data representing the physical objects.

In the specification, reference will be made to "prohibited objects". This includes (but is not limited to) e.g. weapons (guns, knives, grenades, etc.), parts of prohibited objects/parts of weapons (e.g. gun barrel, magazines), objects which have the appearance of prohibited objects (e.g. toy guns), etc. Although a typical example of a prohibited object is a threat object, this is however not limitative. The prohibited objects can include an object considered as prohibited at a control or security checkpoint (according to rules set e.g. by an administrator of the security checkpoint and/or by law) and should therefore be detected. For example, a prohibited object in a facility can include e.g. a USB drive, a cellular phone, etc.

Embodiments of the presently disclosed subject matter are not described with reference to any particular programming language. It will be appreciated that a variety of programming languages may be used to implement the teachings of the presently disclosed subject matter as described herein.

The invention contemplates a computer program being readable by a computer for executing one or more methods of the invention. The invention further contemplates a machine-readable memory tangibly embodying a program of instructions executable by the machine for executing one or more methods of the invention.

Attention is drawn to FIG. 1A. FIG. 1A illustrates a system 100 which can be used at a control or security checkpoint, such as in an airport. This is however not limitative, and the system 100 can be used in various other applications.

FIG. 1A illustrates an acquisition device 101 (image acquisition device), which is operative to acquire images of at least part of an item 105.

The acquisition device 101 can generate a three-dimensional (3D) representation of at least part of (or all of) an item (or alternatively can provide data which can be used by a computerized device to generate the 3D representation).

The acquisition device 101 includes for example a computerized tomography (CT) scan, a body scanner, or other types of acquisition devices. This list is not limitative.

Item 105 includes for example, a container, a bag, a piece of cloth, a shoe, etc. These examples are not limitative.

The acquisition device 101 is operatively connected to a computer-implemented system 103. System 103 can be part of the acquisition device 101, or external to the acquisition device 101, or can be partially part of the acquisition device 101 and partially external to it. System 103 is operative to receive a three-dimensional representation 120 of the item 105 (or data informative of the 3D representation) acquired by the acquisition device 101.

System 103 includes a processor and memory circuitry (PMC) 104. PMC 104 is configured to provide processing necessary for operating system 103, as further detailed in the various embodiments described hereinafter, and comprises a processor (not shown separately) and a memory (not shown separately). System 103 can be used to perform various methods described hereinafter, such as (but not limited to) the methods described with reference to FIGS. 1B, 1C, 1D, 3A, 4, 5A and 5B.

In FIG. 1A, PMC 104 is operatively connected to a hardware-based input interface 102. The interface 102 (e.g., a keyboard) can be used e.g., by an operator to interact with system 103. The processor of PMC 104 can be configured to one or more functional modules in accordance with computer-readable instructions implemented on a memory comprised in the PMC 104. Such functional modules are referred to hereinafter as included in the PMC 104.

A functional module comprised in PMC 104 includes a software module 112. According to some embodiments, the software module 112 includes a list of instructions (e.g., an executable code/executable program) stored in a memory.

The instructions can encode operation of a model, such as a machine learning model (e.g., deep neural network), and/or a sequence of computer vision instructions and/or image processing instructions, or other adapted models.

In particular, the instructions are such that, when executed by a PMC (such as PMC 104), they cause the PMC to detect, based on an image 121 of an item received as an input (as explained hereinafter, the image 121 can be generated based on the 3D representation 120 provided by the acquisition device 101), whether a prohibited object is present in the image 121. This will be discussed further in detail hereinafter.

As mentioned above, the software module 112 can implement a machine learning model (also called machine learning network). This includes for example a neural network, such as a deep neural network (DNN). A deep neural network (DNN) comprises layers organized in accordance with a respective DNN architecture. Optionally, at least some of the layers can be organized in a plurality of DNN sub-networks. Each layer of the ML network can include multiple basic computational elements (CE), typically referred to in the art as dimensions, neurons, or nodes. Generally, computational elements of a given layer can be connected with CEs of a preceding layer and/or a subsequent layer. Each connection between a CE of a preceding layer and a CE of a subsequent layer is associated with a weighting value. A given CE can receive inputs from CEs of a previous layer via the respective connections, each given connection being associated with a weighting value which can be applied to the input of the given connection. The weighting values can determine the relative strength of the connections and thus the relative influence of the respective inputs on the output of the given CE. The given CE can be configured to compute an activation value (e.g. the weighted sum of the inputs) and further derive an output by applying an activation function to the computed activation. The activation function can be, for example, an identity function, a deterministic function (e.g., linear, sigmoid, threshold, or the like), a stochastic function, or other suitable function. The output from the given CE can be transmitted to CEs of a subsequent layer via the respective connections. Likewise, as above, each connection at the output of a CE can be associated with a weighting value which can be applied to the output of the CE prior to being received as an input of a CE of a subsequent layer. Further to the weighting values, there can be threshold values (including limiting functions) associated with the connections and CEs.

The weighting and/or threshold values of the DNN can be initially selected prior to training and can be further iteratively adjusted or modified during training to achieve an optimal set of weighting and/or threshold values in a trained ML network. After each iteration, a difference (also called loss function) can be determined between the actual output produced by ML network and the label or class associated with the respective training set of data. The difference can be referred to as an error value. Training can be determined to be complete when a cost or loss function indicative of the error value is less than a predetermined value, or when a limited change in performance between iterations is achieved. Optionally, at least some of the ML subnetworks (if any) can be trained separately, prior to training the entire ML network.

A set of ML network input data used to adjust the weights/thresholds of a deep neural network is called a training set.

According to some embodiments, the machine learning model of the software module 112 is used to implement a segmentation algorithm (e.g., a semantic segmentation algorithm, such as, but not limited to, U-net, Mask-RCNN), and/or an object detection algorithm (such as, but not limited to, R-CNN, Region-Based Convolutional Neural Networks, Fast R-CNN, and YOLO (You Only Look Once), etc.).

Upon processing the image 121, system 103 can send data informative of the output of the processing to a device 107 enabling a visual and/or audio representation of the processing. Device 107 includes e.g. a screen and/or a loudspeaker. In some embodiments, system 103 can trigger an alert and/or send instructions to another device 108 to trigger an alert.

It is noted that at least part of system 103 illustrated in FIG. 1A can be implemented in a distributed computing environment, in which the aforementioned functional module(s) shown in FIG. 1A can be distributed over several local and/or remote devices and can be linked through a communication network.

Figure 1B:
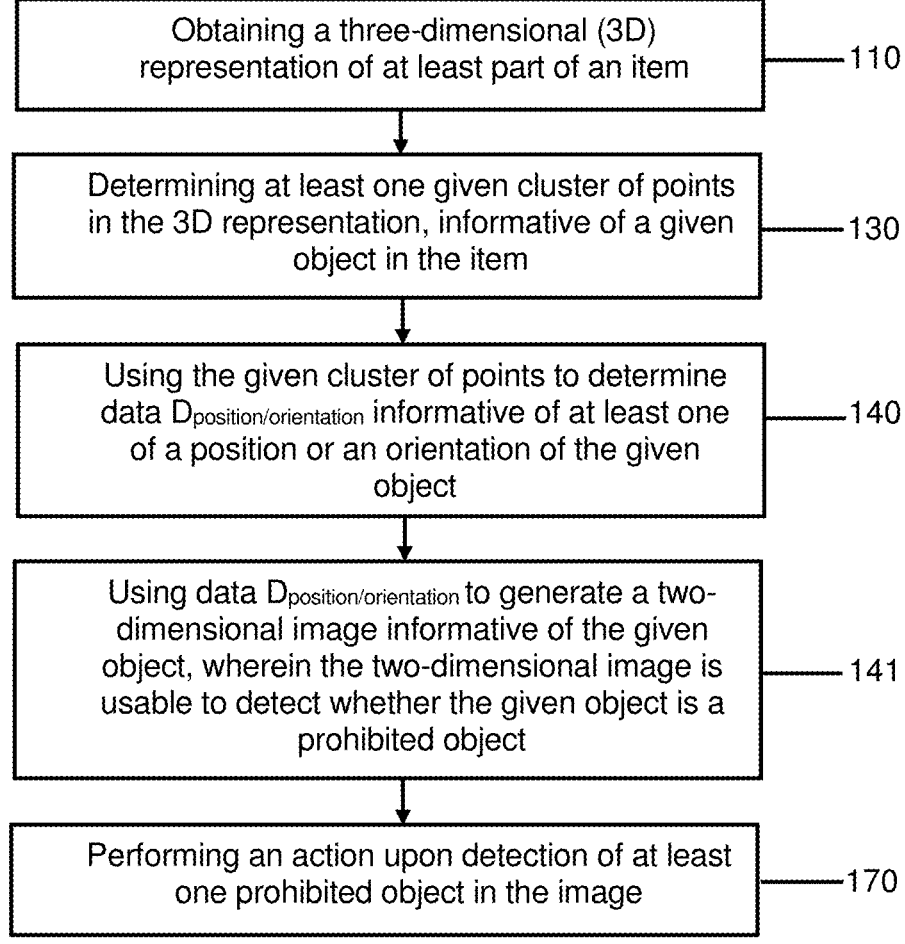
FIG. 1B illustrates a flow chart of an embodiment of a method of detecting a prohibited object in an item, using a three-dimensional representation of the item.

Attention is now drawn to FIG. 1B.

The method of FIG. 1B includes obtaining (operation 110) a three-dimensional (3D) representation of at least part of an item. The 3D representation is also called a 3D image. The 3D representation includes a plurality of points (also called pixels, or voxels). Each given point is associated with a given position (expressed for example as 3D coordinates Xpoint, Ypoint, Zpoint in a common referential) and an intensity (also called pixel intensity). The intensity is for example a grey level intensity (scalar value). In some embodiments, the intensity can include one or more values, each value being associated with a different channel of the acquisition device 101. For example, a dual energy CT scan uses different channels (e.g. high energy and low energy channels), thereby providing different values for each pixel.

Figure 1D:
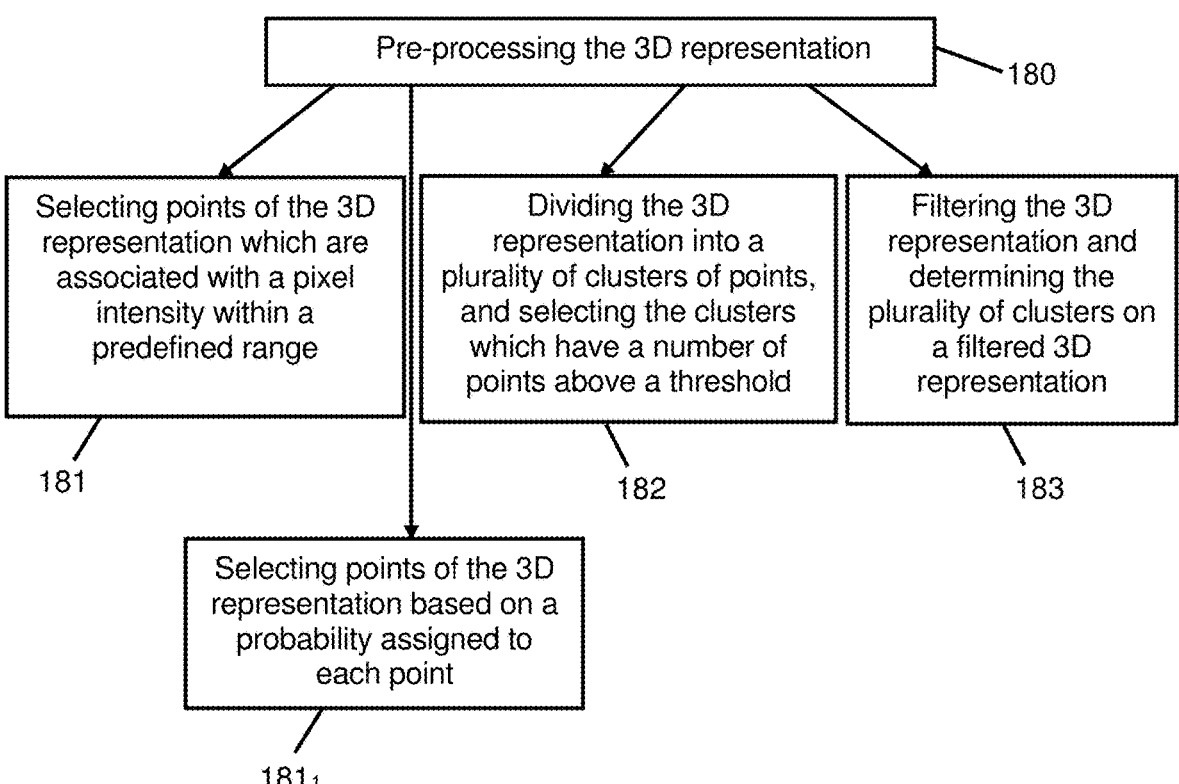
FIG. 1D illustrates a flow chart of an embodiment of processing operations of the three-dimensional representation of the item.
Figure 2A:
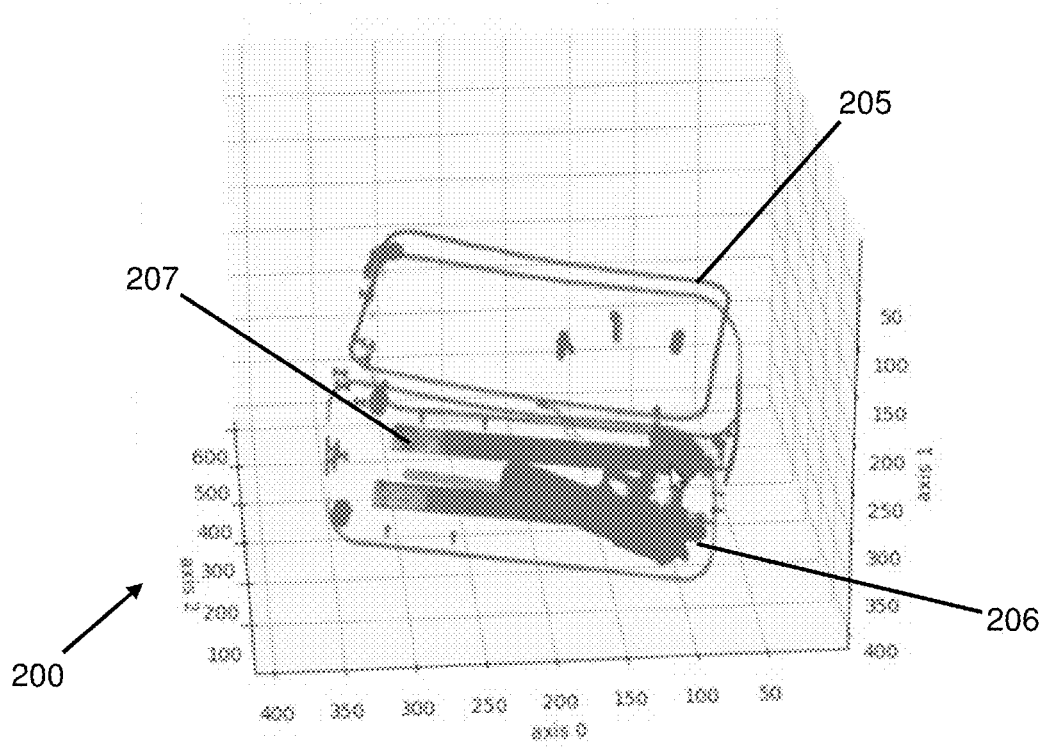
FIG. 2A illustrates a non-limitative example of a three-dimensional representation of an item.

A non-limitative example of a three-dimensional (3D) representation 200 of an item 205 is depicted in FIG. 2A. Note that this 3D representation 200 has already been pre-processed using one or more operations described hereinafter (see FIG. 1D).

In this example, the item 205 is a baggage. A prohibited object 206 (a gun in this example) is present in the item 200. The item 205 also includes other elements, such as non-prohibited objects present in the item 205.

The item 205 can include concealing elements. Concealing elements enable a user to hide (at least partially) the prohibited object in an image of the item. The concealing element acts as "mask" and renders detection of the prohibited object more difficult. The concealing element typically includes a metallic material, although this is not mandatory (e.g., thick organic substances, books and/or other materials). The material of the concealing element(s) attenuates the electromagnetic waves transmitted by the acquisition device 101, and therefore the prohibited object is less visible in the image than if it was not located above/underneath/within the concealing element. Non-limitative examples of concealing elements include baggage metallic tubes 207 (see FIG. 2A), bag icon, combination lock, reinforcement strips (or reinforcement sheets) of shoes, etc.

The method of FIG. 1B further includes determining (operation 130) at least one given cluster of points in the 3D representation. The given cluster of points is informative of a given object present in the item. For example, the given cluster of points is informative of a prohibited object (e.g., a gun), and/or of an unprohibited object (such as a baggage metallic tube). Note that in some cases, the cluster of points may be informative of only part of a given object present in the item, and/or of more than one given object (as explained with reference to operation 183 in FIG. 1D, the method can include operations which attempt to avoid such a case, in order to obtain a cluster of points which is informative mostly or only of a single given object).

A cluster of points can correspond to points of the 3D representation which meet a proximity criterion (e.g., the distance between the points is below a threshold).

Note that in some embodiments, some pre-processing operations (reference 180) can be performed on the 3D representation. In some embodiments, at least some of the pre-processing operations can be performed before determining clusters of points of the 3D representation.

Examples of these pre-processing operations are depicted in FIG. 1D.

A pre-processing operation can include selecting (operation 181) a fraction of the points of the 3D representation which are associated with an intensity which is within a predefined range (see hereinafter other examples to select points within the 3D representation).

According to some embodiments, assume that it is intended to detect a prohibited object which is mainly (or entirely) a metallic object. For example, it is attempted to detect a gun which is mostly made of metal.

The metallic objects have an intensity in the 3D representation which is within a first predefined range (generally known in advance—this range may depend on the type of the acquisition device 101). For example, the first predefined range can correspond to an intensity which is above 2.000 (this value is not limitative).

According to some embodiments, assume that it is intended to detect a prohibited object which is a plastic object. Indeed, some weapons are made of plastic.

The plastic objects have an intensity in the 3D representation which is within a second predefined range (generally known in advance—this range may depend on the type of the acquisition device 101). For example, the second predefined range can correspond to an intensity which is between 500 and 1.000 (these values are not limitative).

As mentioned above, in some embodiments, each point can be associated with two intensity values (high energy response and low energy response). In this case, it is possible to determine the relevant points using a first predefined range for the high energy response and a second predefined range for the low energy response.

Once this selection has been performed, the cluster(s) of points (as mentioned at operation 130) can be determined based only on the points of the 3D representation that have been selected at operation 181.

Figure 2B:
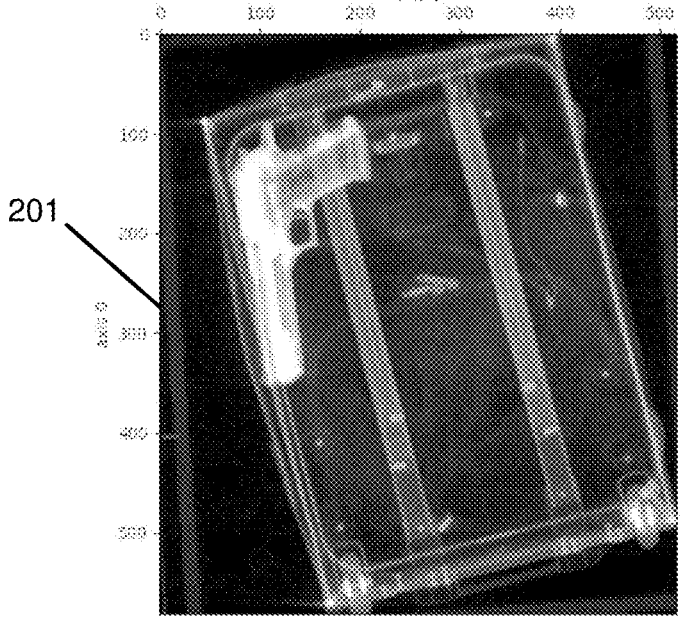
FIG. 2B depicts images (acquired using different viewing angles) of an item provided by an acquisition device.
Figure 2B:
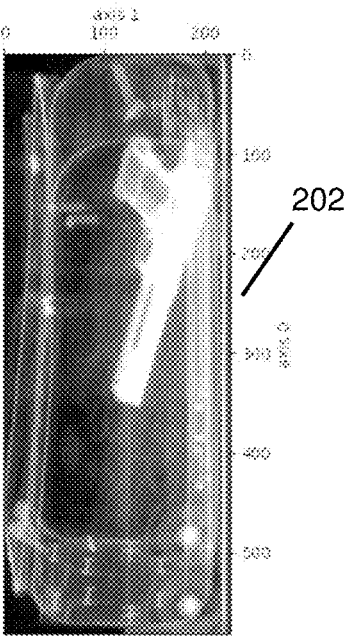
Figure 2B:
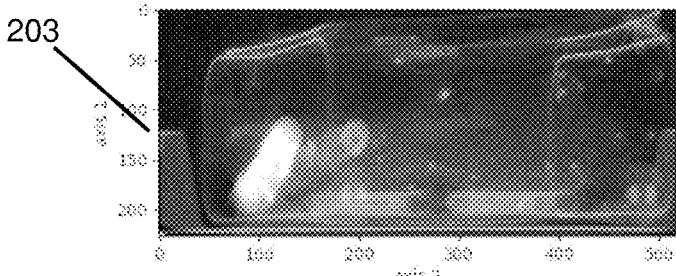
Figure 2C:
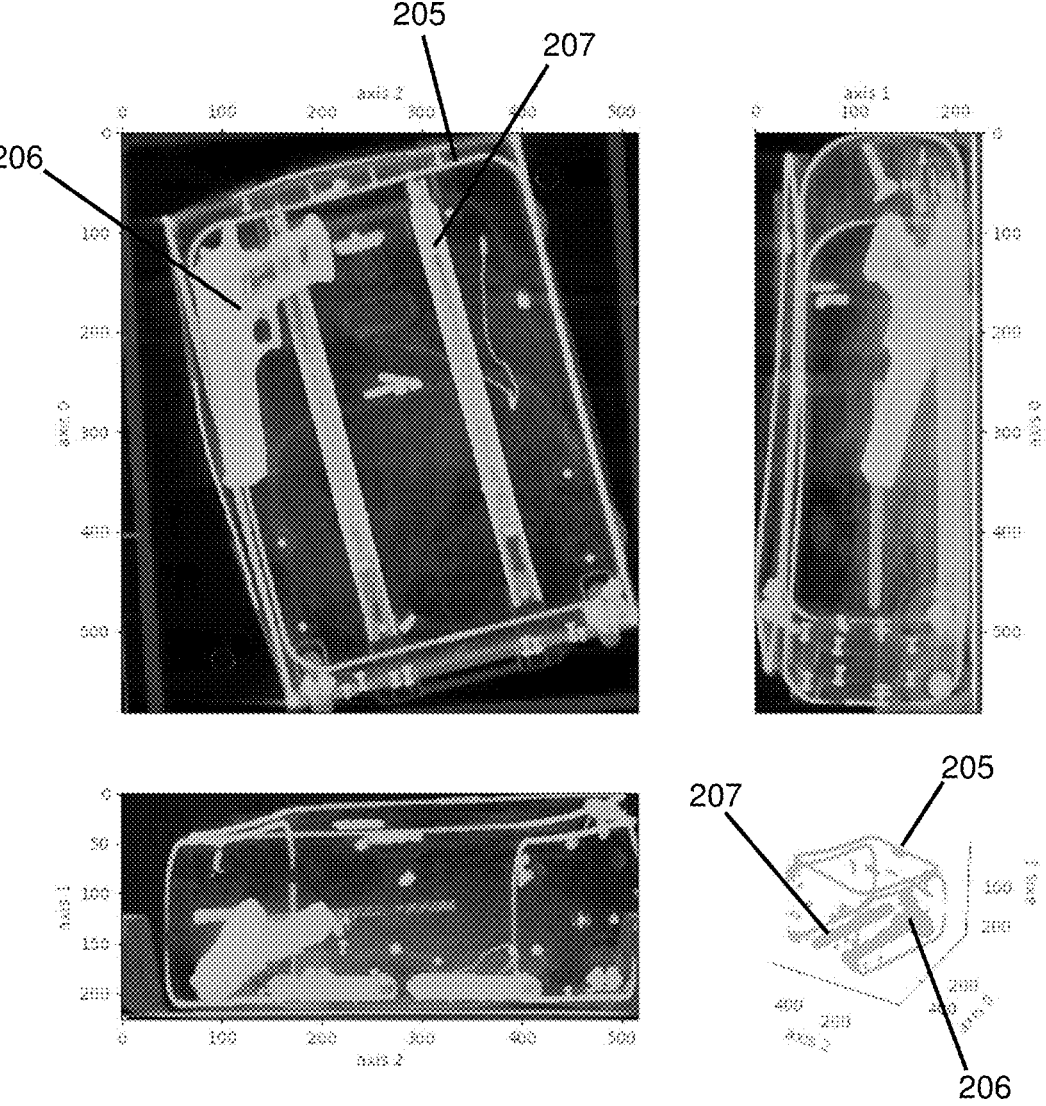
FIG. 2C illustrates the images of FIG. 2B, in which the points, which have an intensity corresponding to metallic points have been identified.

A non-limitative example of operation 181 is depicted in FIGS. 2B and 2C.

FIG. 2B depicts images provided by the acquisition device 101. As mentioned above, the acquisition device 101 enables generating a three-dimensional (3D) representation of at least part of an item, and FIG. 2C illustrates two-dimensional views 201, 202 and 203 of this 3D representation. These two-dimensional views 201, 202 and 203 are associated with different viewing angles of the item.

FIG. 2C illustrates the images of FIG. 2B, in which the points which have an intensity corresponding to metallic points have been identified (these points are colored artificially in blue). The images of FIG. 2C therefore include the metallic parts 205, 207 of the baggage, and the prohibited gun 206.

According to some embodiments (see operation 1811 in FIG. 1D), each point is assigned with a probability (e.g., statistical probability between 0 and 1) that the pixel intensity corresponds to a prohibited object. A map of probabilities is obtained, which can be processed to select a fraction of the pixels (processing of the map can include e.g., using weighted SVD, or applying filtering and a threshold, or using ground truth values, or other approaches).

According to some embodiments, the pre-processing operations 180 can include dividing (operation 182) the three-dimensional (3D) representation of the at least part of the item into a plurality of clusters of points. Algorithms such as three-dimensional connected-component labelling (this is not limitative) can be used to perform this division into clusters. Points which belong to a same cluster meet a proximity criterion. In other words, the division into clusters is mainly based on the proximity between the points.

Note that operation 182 is generally performed after operation 181, since it is more efficient to create clusters based on the points of interest. This is however not limitative.

Operation 182 can further include selecting only the clusters which include a number of points which is above a threshold. Indeed, the smaller the number of points within the cluster, the higher the probability that the cluster is not informative of an object of interest. The threshold can be defined e.g., by an operator. In some embodiments, once the total number N of clusters has been determined, the M clusters which have the largest number of points are selected out of the N clusters (with M<N). The value M can be defined e.g., by an operator.

According to some embodiments, given clusters of the 3D representation can be detected as not being informative of a prohibited object, based on detection that one or more geometrical parameters of each of the one or more given clusters are not within an expected range. For example, if it is expected to detect a gun, the expected length and/or expected width and/or expected thickness of the gun in the image is within an expected range of values. If the length and/or the width and/or the thickness of one or more given cluster(s) of points are not within this expected range of values, these one or more given cluster(s) of points can be identified as not being informative of a prohibited object.

Figure 2D:
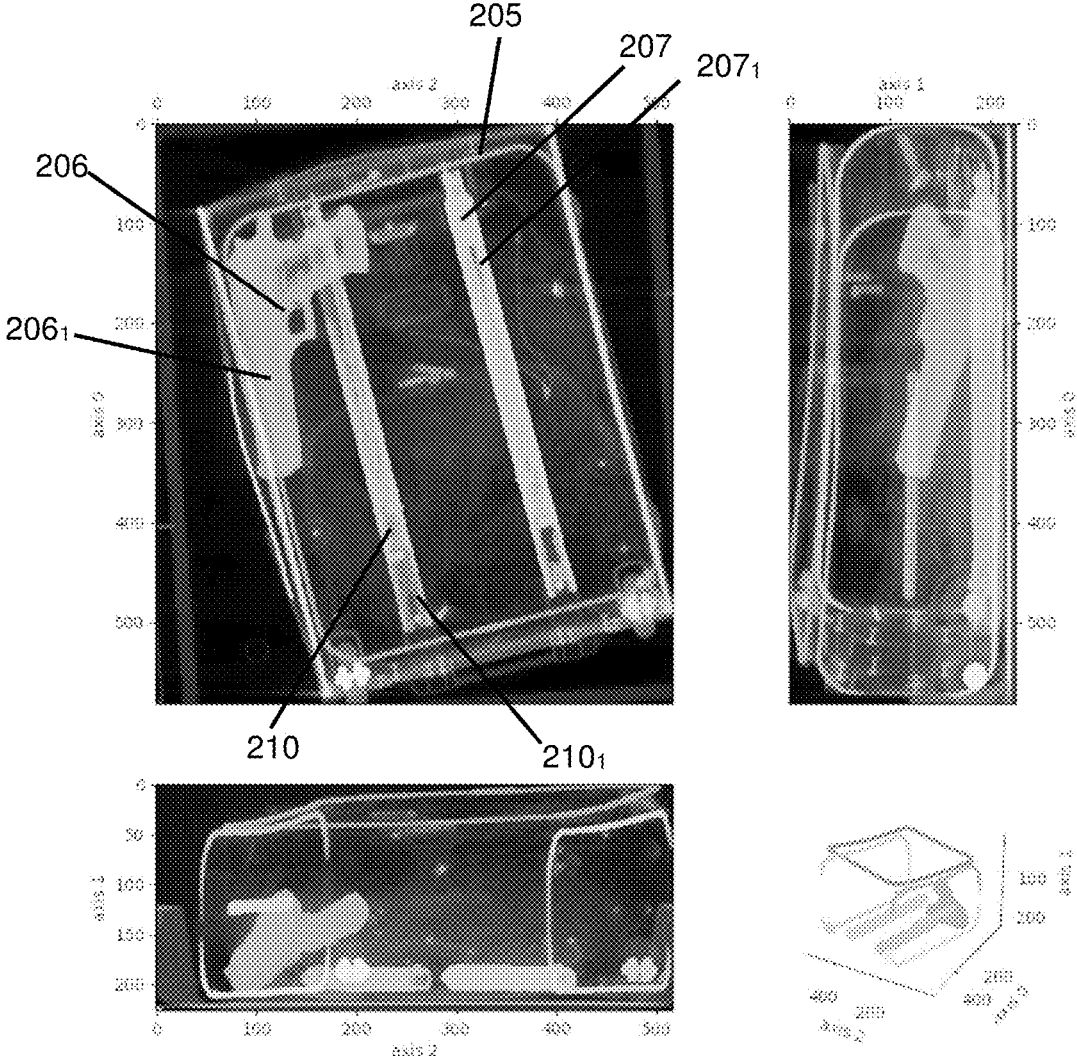
FIG. 2D depicts an example of a division of the metallic points of FIG. 2C into clusters of points, and a selection of clusters of points which are associated with the largest number of points.

FIG. 2D depicts an example of a division of the metallic points in cluster of points, and a selection of the fraction of the clusters which are associated with the largest number of points. As a consequence, a cluster of points 2061 informative of the prohibited object 206 is obtained. A cluster of points 2071 informative of a first baggage tube 207 of the baggage is obtained, and another cluster of points 2101 informative of a second baggage tube 210 of the baggage is obtained. Other clusters of points are visible in FIG. 2D.

After operation 182, the small clusters of points are removed from the three-dimensional (3D) representation. This can be seen by comparing the images of FIG. 2D with the images of FIG. 2C. As explained above, the 3D representation can be divided into a plurality of clusters of points. In some cases, it can occur that a prohibited object touches another object which is not prohibited, and the method may generate a single cluster (instead of generating two clusters of points).

Therefore, the method can include applying a filter to at least part of the three-dimensional (3D) representation of the item, to determine the plurality of clusters on the filtered three-dimensional (3D) representation (operation 183 in FIG. 1D). The filter is for example a Gaussian filter (this is not limitative). This type of filter generally mixes the intensity of each given pixel with the intensity of the pixels located in the neighbourhood of the given pixel.

Once the filter has been applied, for each pixel, an output value is obtained. Areas for which the output value is above a threshold generally correspond to objects which can be prohibited objects (e.g., a gun, which is a massive object), whereas areas for which the output value is below a threshold generally correspond to objects which are not prohibited objects (for example, the zipper of the baggage, for which the mass distribution is more spread).

Figure 2E:
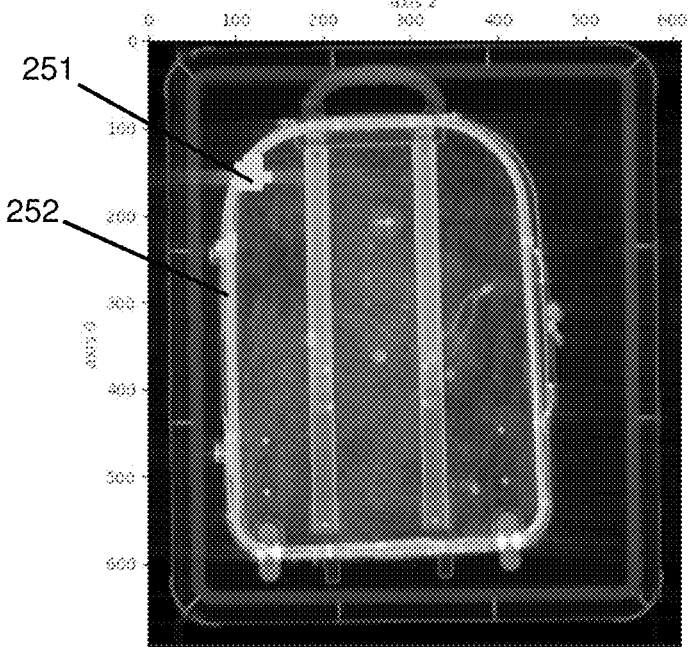
FIG. 2E depicts an example of filtering the images in which a prohibited object (a gun) touches a non-prohibited object (zipper of the baggage)

An example of operation 183 is depicted in FIG. 2E, in which a gun part (a barrel) touches the zipper of the baggage. After application of a filter, it turns out that the pixels 251 informative of the gun part get an output value which is much higher than the pixels 252 informative of the zipper. Therefore, it is possible to differentiate between the cluster of points informative of the gun and the cluster of points informative of the zipper. It is therefore possible to handle each cluster separately (using e.g., the methods of FIG. 1B, 5A or 5B).

Reverting to the method of FIG. 1A, the method further includes using (operation 140) the given cluster of points to determine data Dposition/orientation informative of a position (position of the given object within the 3D representation) and/or of an orientation (spatial orientation) of the given object. Dposition/orientation can be informative of one or more planes in which the given object is located.

According to some embodiments, Dposition/orientation includes a centre of mass of the points within the cluster, which is informative of a centre of mass of the given object. The centre of mass can be calculated using an average of the points within the cluster.

In some embodiments, once the centre of mass has been determined, it is possible to express the coordinates of the points within the cluster with respect to the centre of mass, and to use these converted coordinates to determine orientation of the objet with respect to the centre of mass.

According to some embodiments, data Dposition/orientation includes one or more axes informative of the orientation of the given object. In some embodiments, for cylindrical objects such as a grenade, it is sufficient to determine one axis (axis of symmetry). For other objects, more than one axis can be calculated.

According to some embodiments, axes Xobj, Yobj and Zobj (e.g., three axes) informative of the orientation of the given object are determined. Theses axes can be informative of the direction along which the points informative of the given object are spread.

For example, the three axes Xobj, Yobj and Zobj are informative of the principal axes of the given object. In some embodiments, the three axes Xobj, Yobj and Zobj are orthogonal. This is not mandatory, and in some embodiments, three axes which are linearly independent (but which are not necessarily orthogonal) can be selected.

Note that the estimate of the spatial orientation of the given objet is not necessarily expressed in a Euclidian representation, but other types of representation can be used (e.g. a cylindrical representation, or a spherical representation, or other adapted representation). The cylindrical representation or the spherical representation can be useful to determine the orientation of a prohibited object such as a hand grenade. This is not limitative.

The given cluster of points (which is a 3D representation of the given object) is used to determine e.g. the axes Xobj, Yobj and Zobj informative of the orientation of the given object. As mentioned above, the axes can be an estimate of the principal axes of the given object. According to some embodiments, operation 140 can include using an algorithm called SVD (Singular Value Decomposition) on the given cluster of points. The input of the algorithm corresponds to the given cluster of points (as mentioned above, the coordinates points may have been expressed with respect to the centre of mass). The output of the algorithm can include a set of axes. Each respective axis is associated with a scalar value informative of the deviation along the respective axis.

SVD can be implemented using various tools or programming languages (e.g., Matlab, NumPy and SciPy in Python, or as a part of the cuSolver library—this is not limitative).

This algorithm outputs three axes Xobj, Yobj and Zobj. Since the cluster of points is informative of a given object, the three axes output by the SVD algorithm correspond to an estimate of the orientation of the given object (e.g., of the three principal axes of the given object). Note that in some cases, the given cluster of points can be informative of more than one object, and in this case, the three axes are informative of the orientation of the group of objects represented by the cluster of points.

Figure 2F:
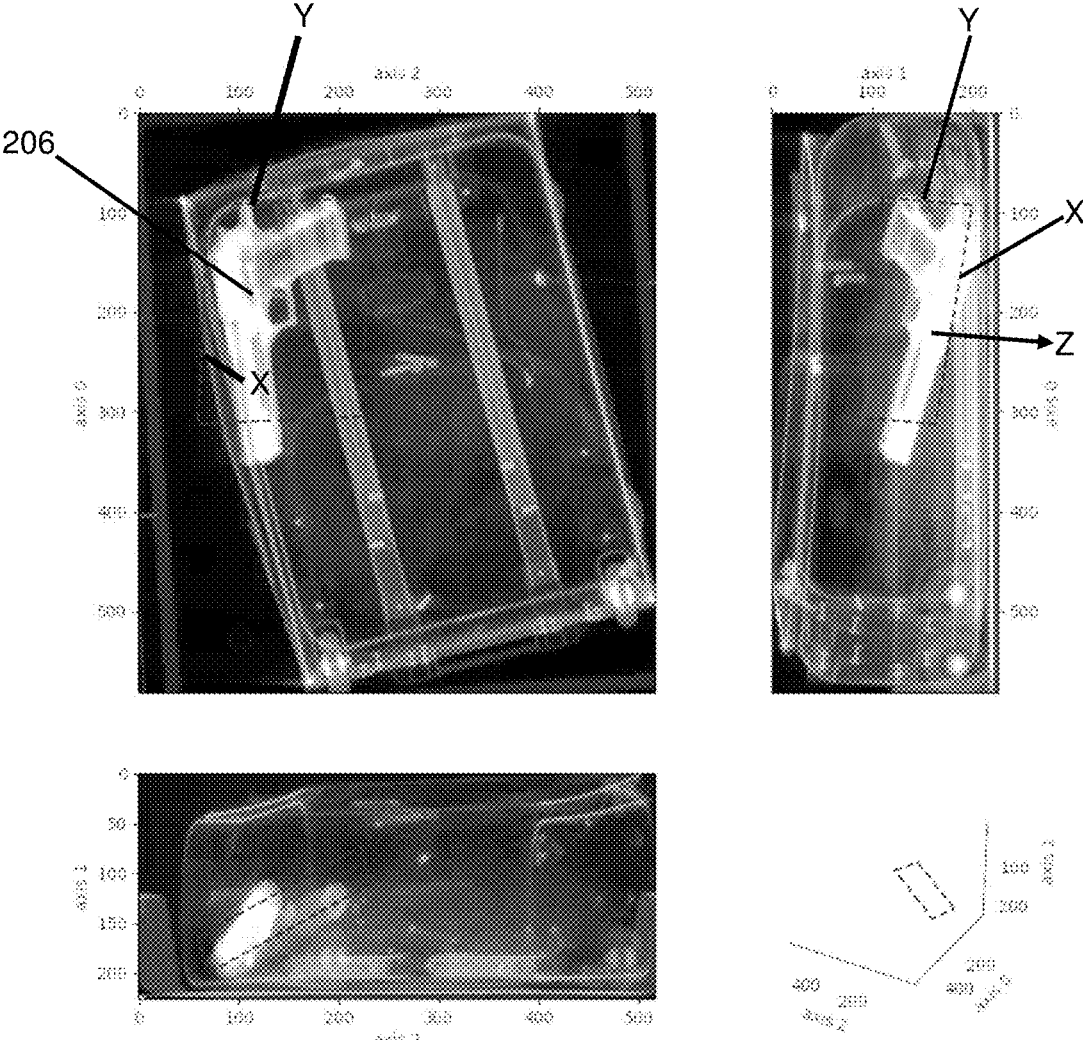
FIG. 2F illustrates a non-limitative example of determining, in the 3D representation, axes informative of principal axes of a prohibited object.

FIG. 2F illustrates a non-limitative example of the three axes Xobj, Yobj and Zobj which are output by operation 140. In this non-limitative example, axes Xobj and Yobj are such that, when the prohibited object 206 lies on a horizontal flat surface (e.g., a table):

the two axes Xobj and Yobj are an estimate of two principal axes of the prohibited object 206 which are substantially parallel to the horizontal flat surface;

the third axis Zobj is an estimate of a third principal axis of the prohibited object 206 which is orthogonal to the horizontal flat surface.

This is however not limitative.

As depicted in FIG. 1B, the method further includes using (operation 141) data Dposition/orientation to generate a two-dimensional image informative of the given object. Various types of projections can be used (e.g. orthogonal projection, cylindrical projection, spherical projection), in order to project (integrate) the intensities of the points from a three-dimensional representation into a two-dimensional representation. In particular, Dposition/orientation can be used to generate a two-dimensional image displaying the given object with a viewing angle matching a desired viewing angle. Note that the desired viewing angle can differ depending on the geometry and/or shape of the prohibited object which is searched.

For example, for a spherical objet (meaning that the prohibited object which is searched is a spherical object), once the center of mass has been determined, a spherical projection can be performed to obtain a two-dimensional image. This spherical projection is a stereographic projection in which the center of projection is chosen as the center of mass. Note that for this kind of projection it is sufficient to estimate the center of mass, and it is not required to determine orientation of the objet, since all points are supposed to be equidistant from the center of mass.

In some embodiments, a region within the cluster can be first determined to generate the two-dimensional image. This is illustrated in FIG. 1C, in which the method further includes determining (operation 150) a region of the 3D representation, wherein the region is determined based on at least part of the given cluster of points and on the data Dposition/orientation.

According to some embodiments, operation 150 can include determining a plane within the 3D representation based on data Dposition/orientation (e.g., based on one or more of the three axes Xobj, Yobj and Zobj). In particular, the plane can be a plane selected within the given cluster of points.

As explained hereinafter (see FIG. 3A), according to some embodiments, the region can be a volume (three-dimensional volume) selected within the 3D representation (in particular, within the given cluster of points), which is determined using this plane. Note that this volume can include, in addition to the original points of the 3D representation, additional points which are located within this volume and have been determined by interpolating the intensity of the original points of the 3D representation within this volume.

In other embodiments, the region can be a 2D region (2D plane) of the 3D representation (in particular, within the given cluster of points), which corresponds to all points of the given cluster of points present in this plane (note that in order to get more points, it is possible to perform an interpolation of the 3D representation, and any point/interpolated point of the given cluster of points located on this plane belongs to the 2D region).

The data Dposition/orientation can be informative of the orientation (and mass distribution) of the given object (which is represented by a given cluster of points within the 3D representation). It is therefore possible to identify a region of the given cluster straddling a plane which provides an optimal view of the given object. This facilitates determining whether the given object is a prohibited object, as explained hereinafter.

Assume for example that it is aimed at detecting a gun. It is advantageous to detect the plane in the 3D representation which corresponds to the points informative of the gun barrel (shooting tube) and the chamber (in which the cartridge is located). Once this plane is detected, it is possible to generate a two-dimensional image of the gun from the 3D representation, which corresponds to a viewing angle orthogonal to this plane. In other words, it is possible to generate an image of the gun, as if the gun is placed on a flat horizontal surface, which is an optimal view of the gun.

According to some embodiments, operation 150 can include determining a single region within the given cluster of points. This approach is computationally efficient. Indeed, it is not necessary to compute a plurality of regions for each given cluster of points, but rather, it is possible to obtain an optimal region which includes, with a high likelihood, all points of the 3D representation corresponding to the prohibited object.

More generally, since operations 130 to 160 can be performed for each of a plurality of different clusters of points determined within the 3D representation, it is possible to generate a single region of cluster of points, which provides a high likelihood to include all points informative of the prohibited object (in case the cluster of points includes the prohibited object).

In addition, the method can include generating a different region for different clusters of points (e.g., the region has a different orientation within the 3D representation for different cluster of points), in order to generate, for each cluster of points, a two-dimensional image of the corresponding object represented by this cluster of points with an optimal viewing angle.

FIG. 2F illustrates a non-limitative example of a region of the three-dimensional representation, generated at operation 150.

The region includes at least part of a two-dimensional plane, which "cuts" the given cluster of points determined at operation 130.

This two-dimensional plane has been determined by selecting a plane of the given cluster of points which includes axis Xobj and axis Yobj (these two axes have been determined at operation 140, as explained above).

Alternatively, the two-dimensional plane can be determined by selecting a plane of the given cluster of points which is orthogonal to axis Zobj (axis Zobj have been determined at operation 140, as explained above).

In order to determine the region based on the axes Xobj, Yobj and Zobj, various methods can be used.

According to some embodiments, operation 140 outputs, for each axis Xobj, Yobj and Zobj a corresponding weight WX, WY and WZ.

For example, when the SVD method is used to determine the axes Xobj, Yobj and Zobj, then the SVD method outputs these weights (see above non-limitative examples of tools which can be used to implement the SVD method).

Each weight WX, WY and WZ is indicative of the geometric distribution along the respective axes Xobj, Yobj and Zobj.

Each weight can indicate a dimension over which the points are spread for each axis (it therefore provides indication on the number of points along each axis and the distance over which they are spread along each axis). The greater the geometrical distribution along the axis (the points are spread over a large "distance" along this axis), the higher the weight, and the lower the geometric distribution, the lower the weight.

It is therefore possible to determine the relevancy of each axis based on the weight associated with this axis.

Figure 2G:
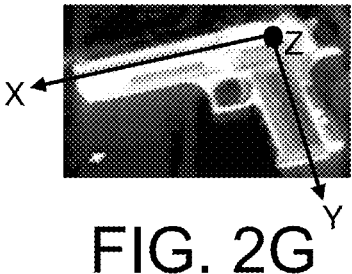
FIG. 2G illustrates axes of a prohibited object.

For an object such as a gun which is a long and flat object, the axis Xobj which corresponds to the axis which has the highest geometric distribution can correspond e.g., to the axis of the gun barrel (see axis Xobj in FIG. 2G), or to a diagonal line connecting the tip of the barrel and the tip of the grip (this is not limitative). The axis Yobj which is informative of the chamber corresponds to an axis which has a medium geometric distribution (see axis Yobj in FIG. 2G). The axis Zobj informative of the thickness of the gun has the smallest geometric distribution (since the thickness of the gun is smaller than the length of the gun—see axis Zobj in FIG. 2G).

In other words, for a gun, it is possible to detect the plane Xobj-Yobj (in which the gun barrel and the chamber are located) by selecting, among the axes Xobj, Yobj and Zobj determined at operation 140, the two axes Xobj, Yobj which are associated with the weights WX, Wy which indicate that the geometric distribution is larger along the two axes Xobj, Yobj than along the axis Zobj (or conversely, the weights WX, Wy and WZ indicate that the geometric distribution along the axis Zobj is smaller than along the two axes Xobj, Yobj).

Selection of the two axes which are associated with the two largest weights WX, Wy enables to identify the plane corresponding to the gun barrel and the chamber of the gun.

FIG. 2F illustrates an example in which the plane Xobj-Yobj, identified using the method described above, corresponds to the plane of the gun barrel and of the chamber.

Note that the determination of the region of the 3D representation based on Dposition/orientation (which includes e.g., the axes Xobj, Yobj and Zobj) can differ based on the type of prohibited object which has to be detected. Indeed, each type of prohibited object has its own geometrical properties/mass distribution, and therefore, a different plane of interest can be determined depending on the type of prohibited object. As explained hereinafter, the region is selected to generate a two-dimensional image of the object with an optimal viewing angle, and this optimal viewing angle can depend on the type of prohibited object to detect. According to some embodiments, the region is determined based on Dposition/orientation (which includes e.g., on one or more of the three axes Xobj, Yobj and Zobj) for a first type of prohibited objects differently than for a second type of prohibited objects, wherein the second type is different from the first type.

Indeed, for a gun, it is beneficial to obtain a region which includes the gun barrel and the chamber, because of the particular shape of the gun (long and flat).

For a different prohibited object (such as a grenade), it is possible to determine a different region.

According to some embodiments, it is possible to select a region of the given cluster of points which includes the two axes which are associated with the geometric distribution which are the smallest.

In other embodiments, it is possible to determine a plane which includes two axes X'obj, Y'obj determined based on one or more of the axes Xobj, Yobj and Zobj. The axes X'obj, Y'obj can be different from Xobj, Yobj and Zobj. For example, the plane X'obj-Y'obj can be a plane which has a particular inclination (e.g., predetermined inclination) with respect to the plane Xobj-Yobj, or the plane Xobj-Zobj, or the plane Yobj-Zobj. Other examples can be used, depending on the type of prohibited object.

In some embodiments (see FIG. 3A), assume that a plane of the given cluster of points has been determined using one or more of the axes Xobj, Yobj, Zobj (operation 300). Assume for example, that the plane Xobj-Yobj has been determined.

Figure 3A:
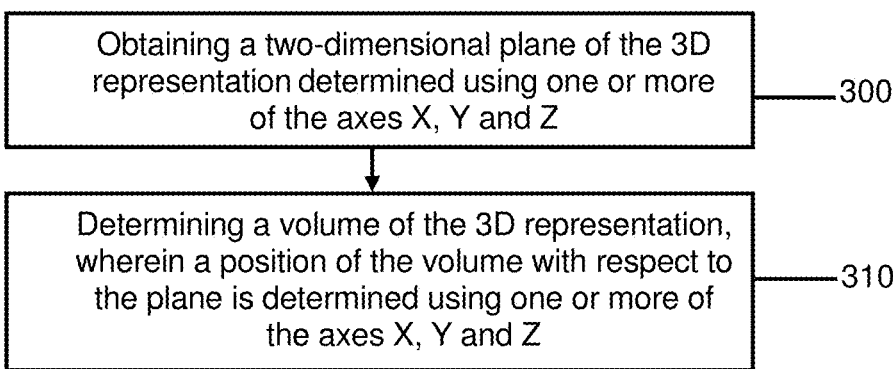
FIG. 3A illustrates a flow chart of an embodiment of a method of determining a volume of interest within a cluster of points.

The method of FIG. 3A can include determining (operation 310) a region of the 3D representation which includes, in addition to at least part of the plane, a volume of the 3D representation. In particular, the volume can include the points present in a 3D area selected within the given cluster of points. A position of the volume with respect to the plane is determined using Dposition/orientation, and in particular using one or more of the axes Xobj, Yobj and Zobj. Note that the plane and the volume can be determined based on the points which belong to the given cluster of points which is under processing.

For example, the volume has a height H+ above the plane along the direction Zobj and/or has a height H− below the plane along the direction Zobj.

The plane is a 2D dimensional representation, with a thickness which is equal to zero. Generally, the prohibited object (such as a gun) has a thickness. It is therefore beneficial to determine a region which includes points above and/or below the plane, in order to obtain additional information on the prohibited object.

In addition, in some cases, the plane (determined using one or more of the axes Xobj, Yobj and Zobj) may not be perfectly aligned with the desired plane (e.g., the points informative of the gun barrel and the chamber of the gun). Therefore, by capturing a volume above and/or below the plane, this prevents from "missing" the desired plane of the object. This volume can be therefore used as a security margin to enable selecting the relevant points in the 3D representation.

According to some embodiments, the volume can be selected based on an estimate of one or more dimensions of a prohibited object. Indeed, if it is aimed at detecting a gun, it is known that the thickness of the gun is generally with a predefined range. The dimensions of this volume can be selected to be within this predefined range. This enables to capture the desired thickness of the prohibited object, while avoiding capturing points belonging to other non-prohibited objects present in the vicinity of the prohibited object. The clutter is therefore reduced.

Selection of one or more appropriate dimensions of the volume (as mentioned above, these dimensions can be determined based on one or more expected dimensions of a prohibited object) enables to capture mostly or only points which are informative of the prohibited object. The points of the volume are not informative of other neighbouring objects of the prohibited object within the item (these neighbouring objects can mask the prohibited object), or in some cases, only a minority of the points of the volume are informative of other neighbouring objects of the prohibited object within the item.

Therefore, when generating a two-dimensional image using the region of the 3D representation, it is possible to obtain an image of the prohibited object without including other objects located in the vicinity of the prohibited object (and which can mask the prohibited object or distract from it).

Figure 3B:
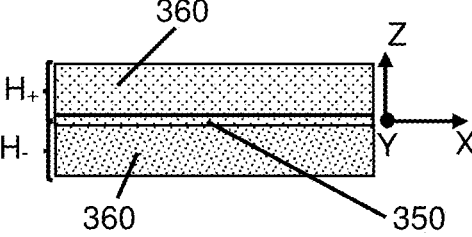
FIGS. 3B and 3C illustrate non-limitative examples of the method of FIG. 3A.
Figure 3C:
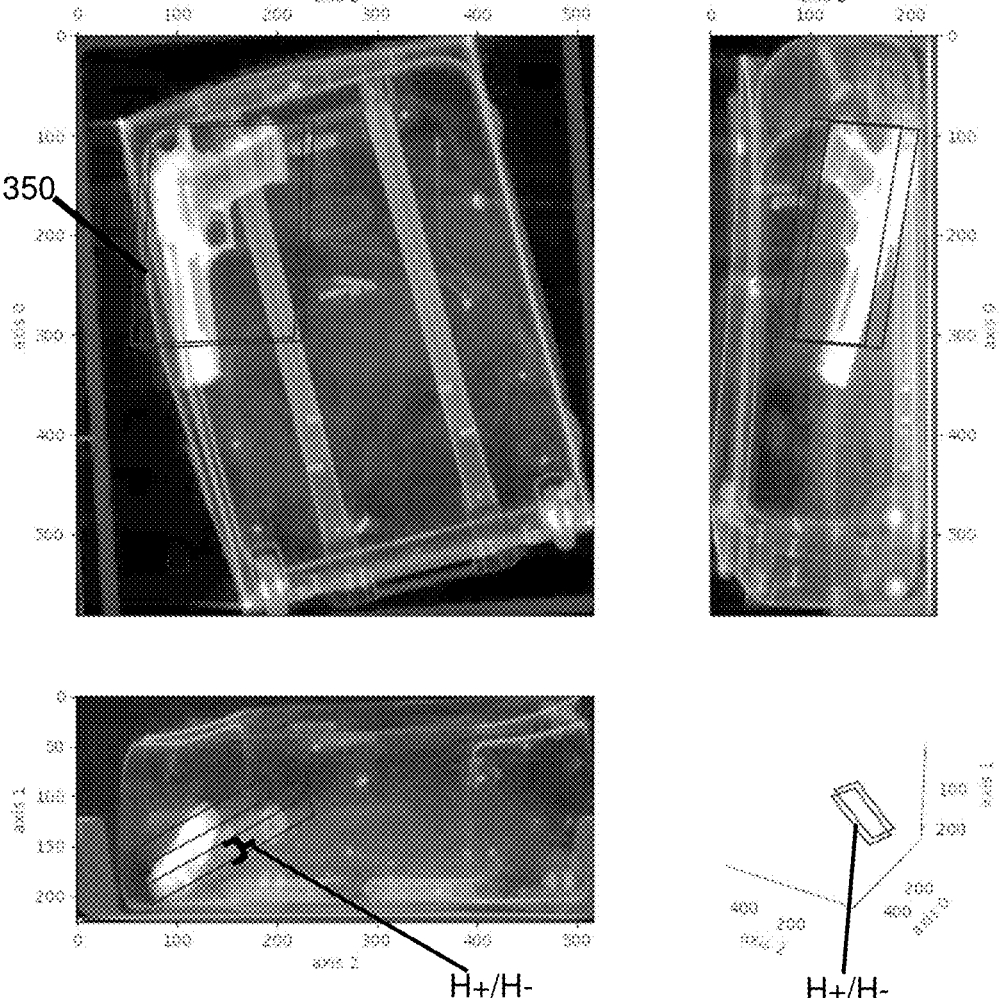

A non-limitative example is illustrated in FIGS. 3B and 3C, in which a plane 350 of the cluster of points has been determined, which includes axes Xobj and Yobj.

It is possible to select a region (of the given cluster of points) which includes the plane 350 and a volume 360 which has a height H+ above the plane along the direction Z, and/or has a height H− below the plane along the direction Z.

As mentioned above, at least one of the height H+ or the height H− can be selected based on an estimate of one or more dimensions of the prohibited object which is searched within the item. Reverting to the method of FIG. 1C, the method further includes using (operation 160) at least said region to generate a two-dimensional image of the given object.

If the region corresponds to a two-dimensional plane, then the two-dimensional image can correspond to the points of the given cluster of points which belong to this two-dimensional plane.

If the region corresponds to a volume of the given cluster of points (as explained with reference to FIG. 3A), an integration (or sum or average) of the intensity of the pixels can be performed along an axis to generate a two-dimensional image. For example, assume that a plane of the cluster of points has been determined as corresponding to axes Xobj and Yobj, and a three-dimensional region has been generated using this plane. A projection of the intensity of the points (which belong to this region) can be performed along axis Zobj (orthogonal to Xobj and Yobj) to generate a two-dimensional image. The projection of the intensity along the axis Zobj relies on standard geometric projection.

Figure 3D:
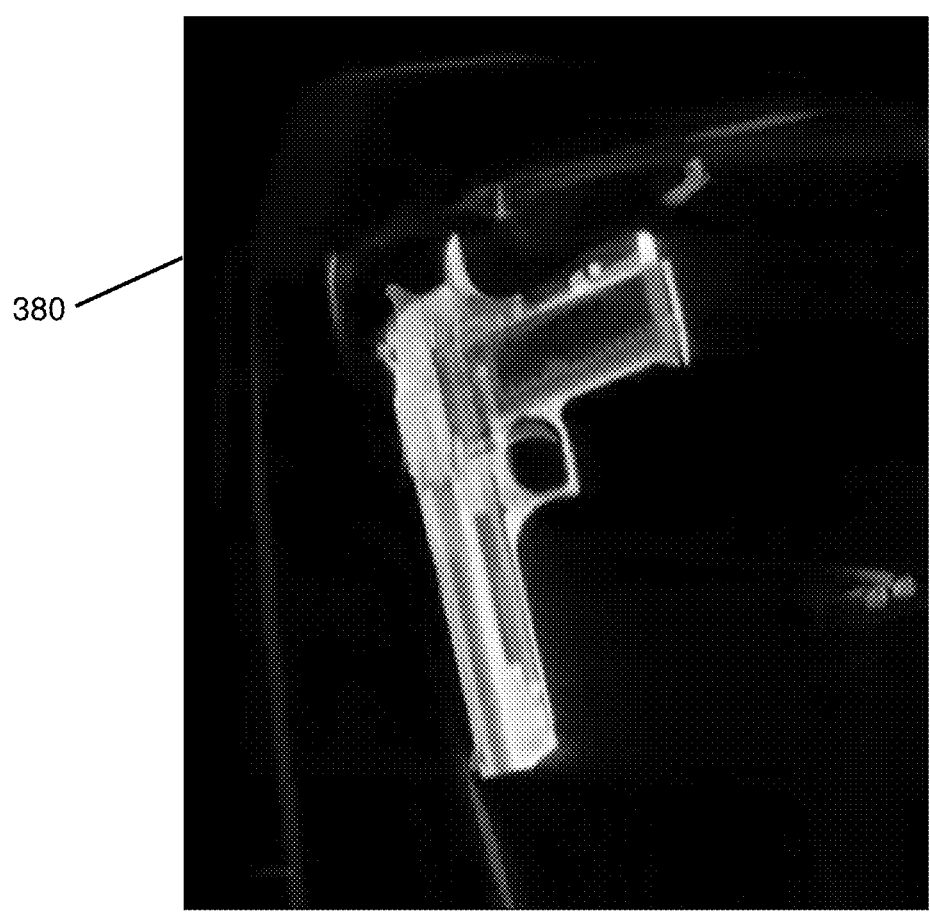
FIG. 3D illustrates a non-limitative example of an image generated by the method of FIG. 1B or 1C.

A non-limitative example of the output of operation 160 is illustrated in FIG. 3D. The method has provided a two-dimensional image 380 of the given object with an optimal viewing angle (in this example, the optimal viewing angle is from the above). In addition, the method did not capture other objects which mask the prohibited object in the item (and therefore in the 3D representation). Detection of the prohibited object using the generated image is therefore facilitated.

According to some embodiments, the image is then used to detect whether the object is a prohibited object. For example, the image can be fed to a trained machine learning model 112 (e.g., deep learning network), which determines a prospect (e.g., probability) that a prohibited object is present. Based at least on this prospect, a decision whether a prohibited object is present in the image can be made. For example, if the prospect is above a threshold (or equal to the threshold), then a decision that a prohibited object is present is made, and if this is not the case, a decision that a prohibited object is not present can be made.

Since the method is able to determine accurately the orientation/position of the prohibited object within the 3D representation (the region has a high likelihood to include most points informative of the prohibited object), and therefore to generate an optimal view of the prohibited object, the output of the machine learning model is a direct estimate of whether the item includes a prohibited object (there is no need to fuse different outputs calculated for different sub-optimal slices of the 3d representation).

In addition, since the method is able to generate an optimal view of the prohibited object, it is possible to train the machine learning model mainly with training images of prohibited objects which have been acquired with an optimal viewing angle.

Indeed, a machine learning model is generally trained with a training set of images including prohibited objects (positive samples) and images which do not include prohibited objects (negative samples). It is possible to use, in the images of the training set which include a prohibited object (positive samples), mostly (or only) images of prohibited objects which have been acquired with a viewing angle which matches an optimal viewing angle according to a criterion.

The criterion can define that the images of the training set have been acquired (or generated) with a viewing angle which does not differ from the optimal viewing angle (for this type of prohibited object) more than a few degrees (this is not limitative).

In some embodiments, the viewing angle of the given object in the two-dimensional image generated using the methods above, and the optimal viewing angle of this type of given object match according to a criterion (e.g., the angle difference is not more than a few degrees—this is not limitative).

According to some embodiments, most of the images of prohibited objects used to train the machine learning model include prohibited objects observed with a viewing angle which matches a viewing angle of the given object in the two-dimensional image according to a criterion. In other words, the machine learning model receives an image of a prohibited object (generated using the method described herein) which is similar to most of the images of prohibited objects used for its training (the viewing angles of the prohibited objects are similar in training and in prediction, which is advantageous).

The optimal viewing angle can depend on the type of prohibited object. For a weapon, the optimal viewing angle can be selected as a top view. For a grenade, the optimal viewing angle can be selected as a side view.

As mentioned above, a projection of the intensity of the pixels can rely on different types of projections, such as orthogonal projection, cylindrical projection, spherical projection, etc. For example, for a grenade which has a cylindrical shape, a projection along the axis of symmetry (determined using Dposition/orientation) of the cylinder can be performed to generate a two-dimensional image.

According to some embodiments, the training set can be generated as follows. A plurality of 3D representations of items (which include a prohibited object) are obtained. Each 3D representation generally includes a plurality of 2D slices.

An operator labels each 2D slice of each 3D representation and indicates (in this label) whether this slice includes a prohibited object. Once the position of the prohibited object in the 3D representation is known, it is possible to determine data Dposition/orientation informative of the orientation of the prohibited object (as explained with reference to operation 140 in FIGS. 1B and 1C), and to use Dposition/orientation to generate a two-dimensional image of the object (with an optimal viewing angle), as explained with reference to operation 141 in FIG. 1B or to operations 150 and 160 in FIG. 1C.

In some embodiments, the image generated at operation 160 can be output on a display 107 to an operator who can decide whether the object is a prohibited object.

In some embodiments, a given object is considered as a prohibited object if both the computerized system and the human operator consider that the given object is prohibited. Note that the method of FIG. 1B (or of FIG. 1C) can be performed (in parallel, or sequentially) for each of a plurality of clusters of points of the 3D representation, in order to determine whether each cluster of points is informative of a prohibited object.

If it is detected that at least one given cluster of points of the 3D representation includes a prohibited object (using operations 130 to 141 in FIG. 1B or operations 130 to 160 in FIG. 1C), an action can be performed (operation 170). Typically, performing an action can include raising an alert. The alert can include e.g. a textual alert and/or visual alert and/or audio alert. The alert can be displayed e.g. on a screen, and/or transmitted to an electronic device (e.g. computer, smartphone) of one or more operators. In some embodiments, raising an alert can include sending a command to another system which can trigger the alert.

In some embodiments, performing an action can include associating, in a database, identity data of the item's owner with a malicious label.

In some embodiments, performing an action can include triggering a system to destroy or annihilate the item and/or the detected prohibited object.

In some embodiments, the action and/or alert can be different depending on the type of prohibited object. For example, for a prohibited object considered as highly dangerous (e.g. an assault rifle), a first type of alert can be raised, and for a prohibited object considered as less dangerous (e.g. scissors), a second type of alert can be raised, different from the first type.

In some embodiments, the action and/or alert can include instructing a conveyor (of the lane) to move the item to a separate area for manual inspection.

In some embodiments, the action and/or alert can include sending an instruction (e.g. to the acquisition device) to immediately stop the conveyor, while the item is still inside the tunnel.

In some embodiments, the method can include outputting additional data informative of the prohibited object(s). This data can include location of the prohibited object in the image.

In some embodiments, the method can output a 3D representation in which location of the prohibited object is emphasized, thereby facilitating manual inspection of the item by an operator.

In some embodiments, data output by the method can include e.g. the size and/or shape and/or type (e.g. knife, rifle, etc.) of the prohibited object.

Figure 4:
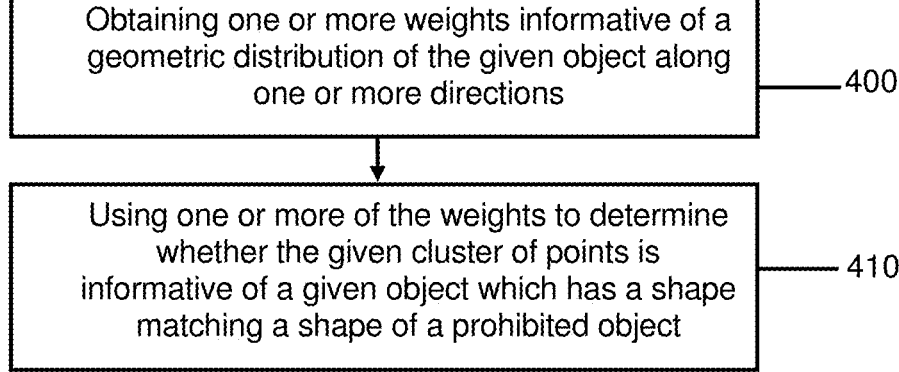
FIG. 4 illustrates a flow chart of an embodiment of a method of determining a mass distribution of a given object, in order to determine whether it corresponds to a prohibited object.

FIG. 4 illustrates a method which can be used to filter objects which do not correspond to a prohibited object.

The method includes obtaining (operation 400) data informative of a geometric distribution of the given object along one or more directions (e.g., along one or more of the axes Xobj, Yobj and Zobj).

As explained above with reference to operation 140, for a given cluster of points informative of a given object, each axis Xobj, Yobj and Zobj can be associated with a respective weight WX, WY and WZ. The weights are indicative of the geometric distribution along the respective axes Xobj, Yobj and Zobj.

The method can further include (operation 410) using one or more of the weights to determine whether the given cluster of points is informative of a given object which has a shape matching a shape of a prohibited object. In particular, the weights can be compared to expected data, and based on this comparison, it can be concluded whether the given cluster of points is informative of a given object which has a shape matching a shape of a prohibited object. Assume that a given type of prohibited object has to be detected. For example, a gun has to be detected, which is a long and relatively flat object. It is therefore expected to obtain a weight indicative of large geometric distribution (corresponding e.g. to the axis of the gun barrel), a weight indicative of medium geometric distribution (corresponding e.g. to the axis of the chamber) and a weight indicative of small geometric distribution (corresponding e.g. to the thickness axis of the gun).

In the example of the gun, the expected data indicates that a large weight and two smaller weights need to be obtained.

For example, if three weights of similar magnitudes are obtained, this may indicate that the object does not correspond to a prohibited object.

In some embodiments, a score can be determined, which indicates to what extent the two weights of smallest magnitudes are small with respect to the weight of highest magnitude. If this score meets an expected score, this indicates that the given object has the desired geometric proportions and may be a prohibited object (and therefore it is worth generating a 2D image thereof, as explained with reference to FIGS. 1B and 1C), and if not, this indicates that the given object is not a prohibited object.

Attention is now drawn to FIG. 5A.

In some embodiments, the prohibited object can comprise a material which is more difficult to identify in the image. For example, the prohibited object can be made (fully or mostly) in plastic. Plastic objects are less visible in the images than metallic objects.

In order to facilitate detection of this kind of prohibited objects, the method of FIG. 5A includes selecting a fraction of the points of the initial three-dimensional (3D) representation which are associated with an intensity which is within a second predefined range. For example, the second predefined range can correspond to the intensity observed for plastic. This enables to obtain a three-dimensional (3D) representation of the item (operation 500), for its further processing. The method further includes determining (operation 510) data Dflatness informative of the flatness of the 3D representation, for each of a plurality of areas of the 3D representation (each area including one or more points of the 3D representation). This can include, for each point (or group of points) of the 3D representation, determining a gradient (also called the magnitude of the vector of partial derivatives) at this point. For example, this gradient (partial derivatives) can be estimated by computing the convolution of the intensity of the points against an appropriate kernel such as (but not limited to) a Gaussian function or a partial derivative of a Gaussian function. As a consequence, a map of gradient values is therefore obtained. A filter, such as a Gaussian filter, can be applied to this map. The output of this filtering can be used as Dflatness. The filter generally assigns a higher score to pixels which are located in the neighbourhood of pixels which are also flat. Therefore, a pixel located at the centre of a flat area, will be assigned a higher score than a pixel located in an area which is not flat. Indeed, if the pixel is located in an area which has a certain curvature, the gradients of the different pixels in this area tend to cancel each other in the filtering operation.

The method further includes determining (operation 520) one or more given clusters of points (each indicative of at least one given object in the item) which are located in area(s) associated with data Dflatness meeting a criterion. For example, the criterion can define that the flatness in this area is above a threshold, and/or that the curvature in this area is below a threshold, and/or can indicate that a pivot point of this area is associated with a flatness above a threshold, and/or can indicate that only a predetermined limited number of areas which are the flattest are selected, etc.

The method further includes performing operations 140 and 141 (see FIG. 1B) or 140 to 160 (see FIG. 1C) on one or more of the given cluster of points determined at 520.

As a consequence, for each given cluster of points, a two-dimensional image is generated. This two-dimensional image provides an optimal viewing angle of the object represented by the given cluster of points in the 3D representation.

Each two-dimensional image can be used to detect whether each given cluster of points is informative of a prohibited object. As mentioned above, a machine learning model can be used to detect whether a prohibited object is present, based on the two-dimensional image.

Figure 5B:
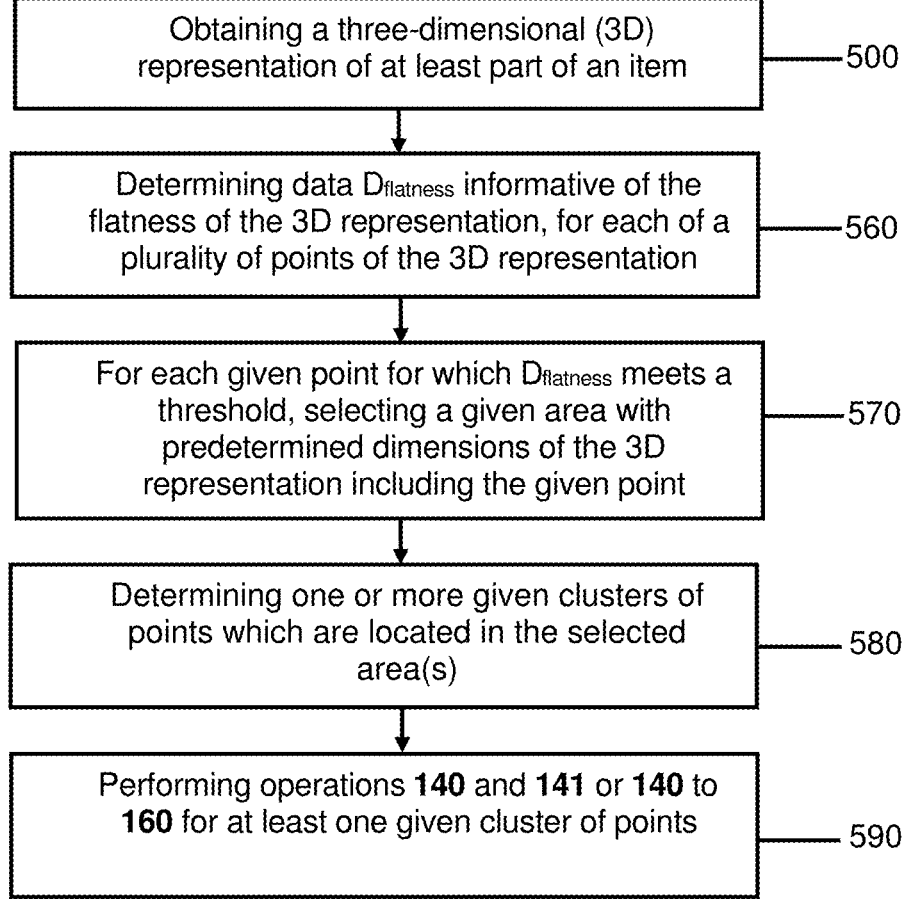
FIG. 5B illustrates a flow chart of particular embodiment of the method of FIG. 5B.

FIG. 5B depicts a particular embodiment of the method of FIG. 5A.

The method includes obtaining a three-dimensional (3D) representation of the item (operation 500). As mentioned above, the 3D representation can be pre-processed to include only the pixels which have an intensity corresponding to the desired range (e.g., plastic intensity range). The method further includes determining (operation 560) data Dflatness informative of the flatness of the 3D representation, for each of a plurality of points of the 3D representation. This can include, for each point (or group of points) of the 3D representation, determining a gradient (also called spatial derivative) at this point. As a consequence, a map of gradient values is therefore obtained. A filter, such as a Gaussian filter, can be applied to this map. The output of this filtering can be used as Dflatness. The filter generally assigns a higher score to pixels which are located in the neighbourhood of pixels which are also flat. Therefore, a pixel located at the centre of a flat area, will be assigned a higher score than a pixel located in an area which is not flat. Indeed, if the pixel is located in an area which has a certain curvature, the gradients of the different pixels in this area tend to cancel each other in the filtering operation.

For each given point for which Dflatness meets a criterion, the method includes determining (operation 570) a given three-dimensional area with predetermined dimensions of the 3D representation, for which the given three-dimensional area includes this given point. Note that the dimensions of the three-dimensional area can be selected based on expected dimensions of the prohibited object.

For example, the given three-dimensional area of the 3D representation is a cube of predetermined dimensions, and the centre of the cube is a point for which Dflatness meets the criterion. The predetermined dimensions of the cube can be determined based on the expected dimensions of the prohibited object. The predetermined dimensions can be selected such that the cube will include the prohibited object, without including too many neighbouring objects. This is not limitative.

Figure 6A:
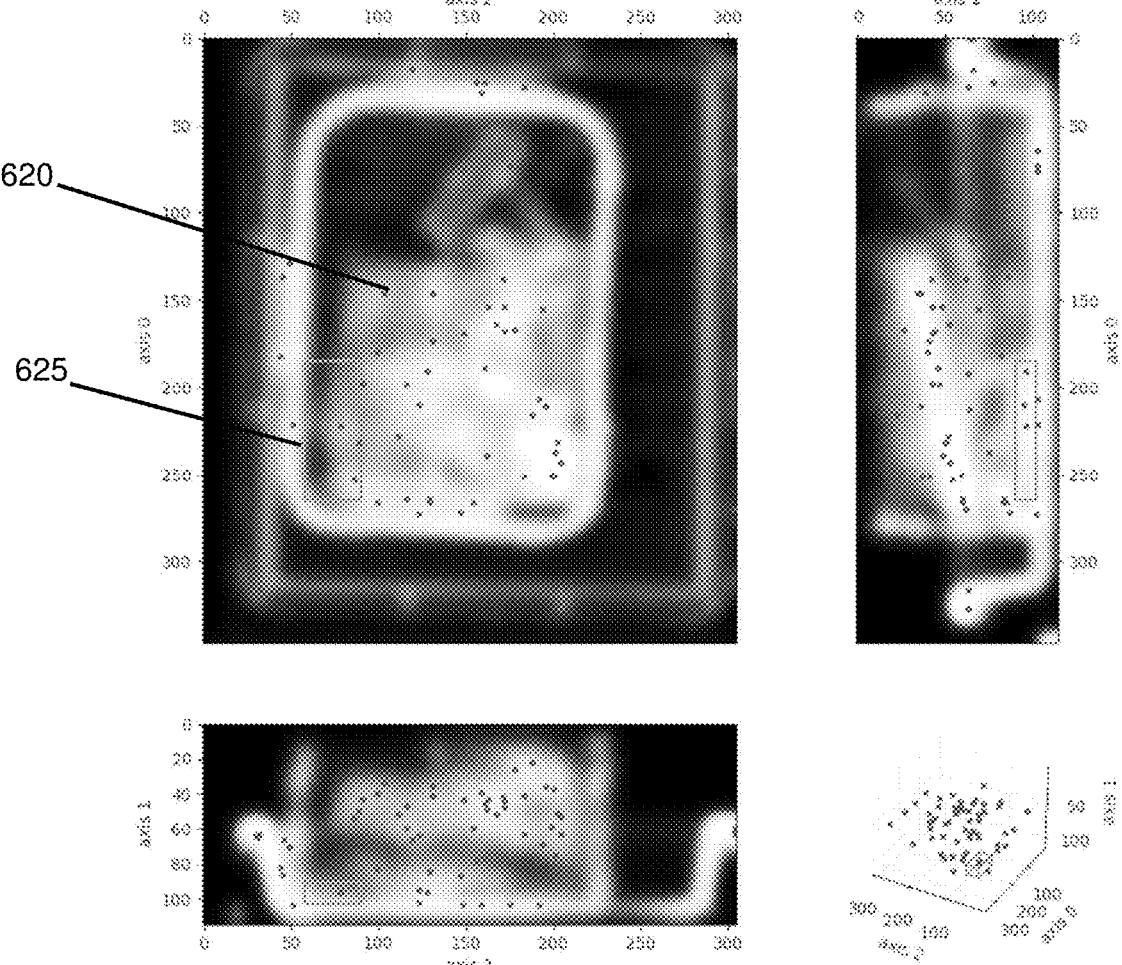
FIGS. 6A and 6B illustrate non-limitative examples of the methods of FIGS. 5A and 5B.

FIG. 6A illustrates points 620 of the 3D representation for which Dflatness meets the criterion. It also illustrates the real location 625 of a prohibited object.

Figure 6B:
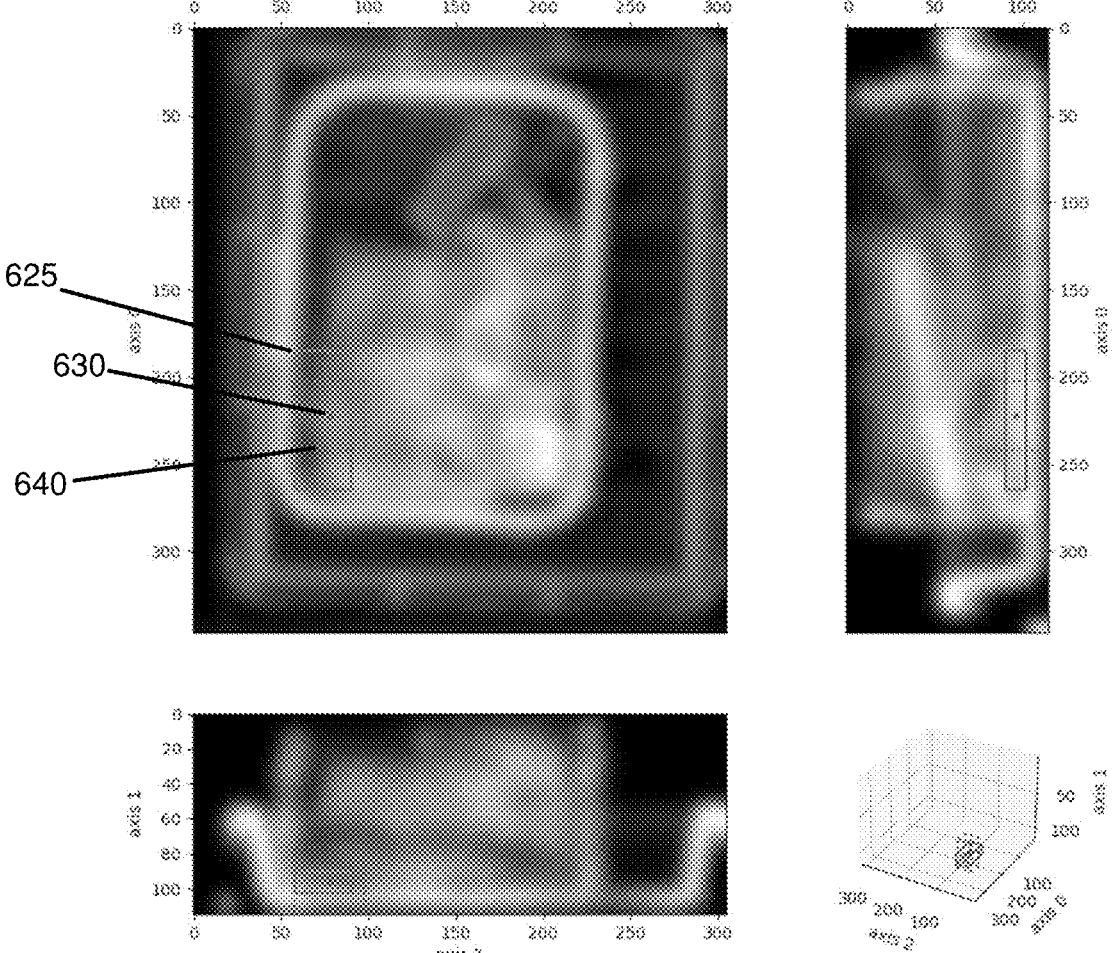

FIG. 6B illustrates a given point 630 for which Dflatness meets the criterion, and a cube 640 of the 3D representation, whose centre is the given point 630.

The method further includes determining (operation 580) one or more given clusters of points (each indicative of at least one given object in the item) which are located in the three-dimensional area(s) determined at 570. In other words, for each area (e.g., a cube—this is not limitative) of the 3D representation, one or more cluster of points are determined (as mentioned above, the cluster of points can be determined based on the proximity of the points within the 3D representation).

The method further includes (operation 590) performing operations 140 and 141 (see FIG. 1B) or 140 to 160 (see FIG. 1C) on one or more of the given cluster of points determined at 520.

Figure 7:
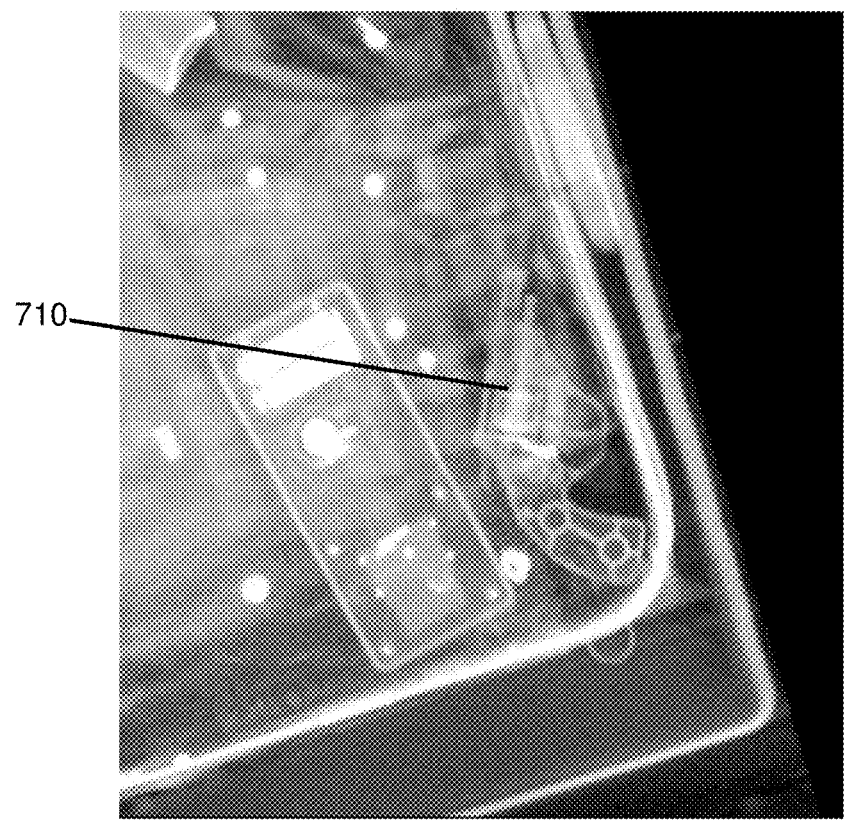
FIG. 7 illustrates an image generated by the methods of FIGS. 5A and 5B.

As a consequence, for each given cluster of points, a two-dimensional image is generated (note that for each area determined at 570, a plurality of given cluster of points can be determined, and therefore, a plurality of images can be determined). This two-dimensional image provides an optimal viewing angle of the object represented by the given cluster of points in the 3D representation. An example of this image is provided in FIG. 7, in which the prohibited object 710 is more visible than in the initial 3D representation. As a consequence, when the image is fed to the machine learning model 112, detection of the prohibited object is facilitated.

Note that the various operations described with reference to the method of FIGS. 1B and 1C (see processing operations described with respect to e.g., FIG. 1D) can be used in the methods of FIGS. 5A and 5B, and are not described again.

It is to be noted that the various features described in the various embodiments may be combined according to all possible technical combinations.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A system comprising one or more processing circuitries configured to:

obtain a three-dimensional (3D) representation of at least part of an item, wherein the three-dimensional representation includes a plurality of points each associated with an intensity obtained based on an acquisition of the at least part of the item by an acquisition device, determine one or more given clusters of points in the 3D representation, each given cluster of points being informative of a given object present in the at least part of the item, for each given cluster:

use the given cluster of points to determine data $D_{position/orientation}$ informative of at least one of a position or an orientation of the given object, determine a single region using at least part of the given cluster of points and the data $D_{position/orientation}$ informative of at least one of a position or an orientation of the given object, and use at least the single region to generate a two-dimensional image displaying the given object with a viewing angle selected to enhance detectability of the given object as a prohibited object, wherein the viewing angle is selected depending on a type of prohibited object to be detected.

2. The system of claim 1, configured to use the data $D_{position/orientation}$ and the single region to generate the two-dimensional image.

3. The system of claim 1, wherein the single region is a three-dimensional region, wherein the system is configured to use $D_{position/orientation}$ to convert intensity of points of the three-dimensional region into a two-dimensional image displaying the given object with the viewing angle selected to enhance detectability of the given object as a prohibited object.

4. The system of claim 1, wherein $D_{position/orientation}$ includes one or more weights informative of a geometric distribution of the given object along one or more directions, wherein the system is configured to use the one or more weights to determine the region.

5. The system of claim 1, wherein the single region is determined based on $D_{position/orientation}$ for a first type of prohibited objects differently than for a second type of prohibited objects, wherein the second type is different from the first type.

6. The system of claim 1, configured to:

obtain one or more weights informative of a geometric distribution of the given object along one or more directions, and use one or more of the weights to determine whether the given cluster of points is informative of a given object which has a shape matching a shape of a prohibited object.

7. The system of claim 1, wherein $D_{position/orientation}$ is informative of three axes $X_{obj}$, $Y_{obj}$, $Z_{obj}$ informative of axes of the given object, wherein the system is configured to:

determine a region of the 3D representation comprising at least part of a plane which comprises two axes $X_{obj}$, $Y_{obj}$ among the axes $X_{obj}$, $Y_{obj}$, $Z_{obj}$, or determine a region of the 3D representation comprising at least part of a plane which is orthogonal to the axis $Z_{obj}$.

8. The system of claim 1, wherein $D_{position/orientation}$ is informative of three axes $X_{obj}$, $Y_{obj}$, $Z_{obj}$ informative of axes of the given object, wherein the system is configured to:

obtain, for the axis $X_{obj}$, a weight $W_X$ informative of geometric distribution along said axis X, obtain, for the axis $Y_{obj}$, a weight $W_Y$ informative of geometric distribution along said axis Y, obtain, for the axis $Z_{obj}$, a weight $W_Z$ informative of geometric distribution along said axis Z, perform (i) or (ii):

(i) determining a region of the 3D representation comprising at least part of a plane which includes two axes $X_{obj}$, $Y_{obj}$, wherein the weights $W_X$, $W_Y$ and $W_Z$ indicate that geometric distribution is greater along the two axes $X_{obj}$, $Y_{obj}$ than along the axis $Z_{obj}$, (ii) determining a region of the 3D representation along a plane which is orthogonal to axis $Z_{obj}$, wherein the weights $W_X$, $W_Y$ and $W_Z$ indicate that geometric distribution along the axis $Z_{obj}$ is smaller than along the two axes $X_{obj}$, $Y_{obj}$.

9. The system of claim 1, configured to determine a region of the 3D representation which includes:

at least part of a plane of the 3D representation determined using $D_{position/orientation}$, a volume of the 3D representation, wherein a position of the volume with respect to the plane is determined using $D_{position/orientation}$.

10. The system of claim 9, wherein at least one of (i) or (ii) is met:

(i) the volume has a height H+ above the plane along a direction $Z_{obj}$, or has a height H− below the plane along the direction $Z_{obj}$, wherein $Z_{obj}$ has been determined using $D_{position/orientation}$, or (ii) one or more dimensions of the volume is selected based on an estimate of one or more dimensions of a prohibited object.

11. The system of claim 9, configured to use said region to generate a two-dimensional image informative of the given object, wherein one or more dimensions of the volume are selected to include mostly or only points which are informative of the given object, wherein a minority or none of these points are informative of other neighbouring objects of the given object in the item.

12. The system of claim 1, configured to:

obtain an initial three-dimensional (3D) representation of the at least part of the item, select a fraction of the points of the initial three-dimensional (3D) representation which are associated with an intensity which is a predefined range, and use the selected points to generate the three-dimensional (3D) representation of the at least part of the item.

13. The system of claim 1, configured to divide the three-dimensional representation of the at least part of the item into a plurality of clusters, wherein points which belong to a same cluster meet a proximity criterion.

14. The system of claim 13, configured to perform at least one of (i) or (ii):

(i) selecting the given cluster as a cluster of the plurality of clusters which includes a number of points which is above a threshold; or (ii) determining that one or more given clusters of the plurality of clusters do not represent a prohibited object, based on a detection that one or more geometrical parameters of each of the one or more given clusters do not comply with an expected range.

15. The system of claim 1, configured to:

determine data $D_{flatness}$ informative of a flatness of areas of the three-dimensional representation, use the data $D_{flatness}$ to determine a given cluster of points in the three-dimensional representation, the given cluster of points being informative of at least one given object present in the item, use the given cluster of points to determine data $D_{position/orientation}$ informative of at least one of a position or an orientation of the given object, and use data $D_{position/orientation}$ to generate a two-dimensional image informative of the given object.

16. The system of claim 1, configured to:

determine, for each given point of a plurality of points of the three-dimensional representation, data $D_{flatness}$ informative of a flatness of said given point, determine a given three-dimensional area of the 3D representation, said given three-dimensional area including said given point, determine a given cluster of points within said given three-dimensional area, use the given cluster of points to determine data $D_{position/orientation}$ informative of an orientation of the given object, determine a region of the 3D representation, wherein the region is determined using at least part of the given cluster of points and $D_{position/orientation}$, and use at least said region to generate a two-dimensional image informative of the given object, wherein the two-dimensional image is usable to detect whether the given object is a prohibited object.

17. The system of claim 1, configured to:

feed the two-dimensional image of the given object to a trained machine learning model, and use the trained machine learning model to determine whether the given object is a prohibited object, wherein at least one of (i) or (ii) is met:

(i) most of the images of prohibited objects used to train the machine learning model include prohibited objects observed with a viewing angle which matches an optimal viewing angle according to a criterion; or (ii) the trained machine learning model has been trained with images of prohibited objects, wherein most of the images of prohibited objects used to train the machine learning model include prohibited objects observed with a viewing angle which matches a viewing angle of the given object in the two-dimensional image according to a criterion.

18. A non-transitory computer readable medium comprising instructions that, when executed by one or more processors, cause the one or more processors to:

obtain an initial three-dimensional (3D) representation of at least part of an item, wherein the initial three dimensional representation includes a plurality of points each associated with an intensity obtained based on an acquisition of the at least part of the item by an acquisition device, select a fraction of the points of the initial three-dimensional (3D) representation which are associated with an intensity which is a predefined range, use the selected points to generate a three-dimensional (3D) representation of the at least part of the item, determine at least one given cluster of points in the 3D representation, the given cluster of points being informative of at least one given object present in the at least part of the item, use the given cluster of points to determine data $D_{position/orientation}$ informative of at least one of a position or an orientation of the given object, and use data $D_{position/orientation}$ to generate a two-dimensional image displaying the given object with a viewing angle selected to enhance detectability of the given object as a prohibited object, wherein the viewing angle is selected depending on a type of prohibited object to be detected.

19. A system comprising one or more processing circuitries configured to:

obtain a three-dimensional (3D) representation of at least part of an item, wherein the three-dimensional representation includes a plurality of points each associated with an intensity obtained based on an acquisition of the at least part of the item by an acquisition device, determine at least one given cluster of points in the 3D representation, the given cluster of points being informative of at least one given object present in the at least part of the item, use the given cluster of points to determine data $D_{position/orientation}$ informative of at least one of a position or an orientation of the given object, determine a region of the 3D representation which includes:

at least part of a plane of the 3D representation determined using $D_{position/orientation}$, and a volume of the 3D representation, wherein a position of the volume with respect to the plane is determined using $D_{position/orientation}$, wherein one or more dimensions of the volume are selected to include mostly or only points which are informative of the given object, wherein a minority or none of these points are informative of other neighbouring objects of the given object in the item, and use said region to generate a two-dimensional image displaying the given object with a viewing angle selected to enhance detectability of the given object as a prohibited object.

* * * * *